(12) United States Patent
Mars

(10) Patent No.: US 12,094,463 B1
(45) Date of Patent: Sep. 17, 2024

(54) DEFAULT ASSISTANT FALLBACK IN MULTI-ASSISTANT DEVICES

(71) Applicant: Amazon Technologies, Inc., Seattle, WA (US)

(72) Inventor: Robert John Mars, Los Gatos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 363 days.

(21) Appl. No.: 17/540,623

(22) Filed: Dec. 2, 2021

(51) Int. Cl.
*G10L 15/22* (2006.01)
*G06F 3/01* (2006.01)
*G10L 15/08* (2006.01)
*G10L 25/78* (2013.01)
*G10L 15/30* (2013.01)

(52) U.S. Cl.
CPC .............. *G10L 15/22* (2013.01); *G06F 3/017* (2013.01); *G10L 15/08* (2013.01); *G10L 25/78* (2013.01); *G10L 2015/088* (2013.01); *G10L 2015/223* (2013.01); *G10L 15/30* (2013.01)

(58) Field of Classification Search
CPC ......... G10L 15/22; G10L 15/08; G10L 25/78; G10L 15/30; G10L 2015/088; G10L 2015/223; G06F 3/017
See application file for complete search history.

(56) References Cited

U.S. PATENT DOCUMENTS

2019/0130898 A1* 5/2019 Tzirkel-Hancock .... G10L 15/22
2019/0295556 A1* 9/2019 Wilberding ............. G10L 17/02
2020/0090646 A1* 3/2020 Smith ..................... G10L 15/22

* cited by examiner

*Primary Examiner* — Abul K Azad
(74) *Attorney, Agent, or Firm* — Pierce Atwood LLP

(57) ABSTRACT

A speech-processing system may provide access to one or more virtual assistants via an audio-controlled device. A virtual assistant may be invoked by speaking a wakeword. In some cases, a default virtual assistant may be invoked when an utterance is spoken without a preceding wakeword. Such a multi-assistant speech-processing system may make an early determination that a received utterance does not include a wakeword, and begin processing the utterance prior to completion of the utterance, thereby reducing user perceived latency. For example, the system may start a timer when a gesture and/or voice activity is detected. If no wakeword is detected after a time corresponding to speaking durations of known wakewords, the system may determine that the utterance is to be processed according to the default virtual assistant.

20 Claims, 14 Drawing Sheets

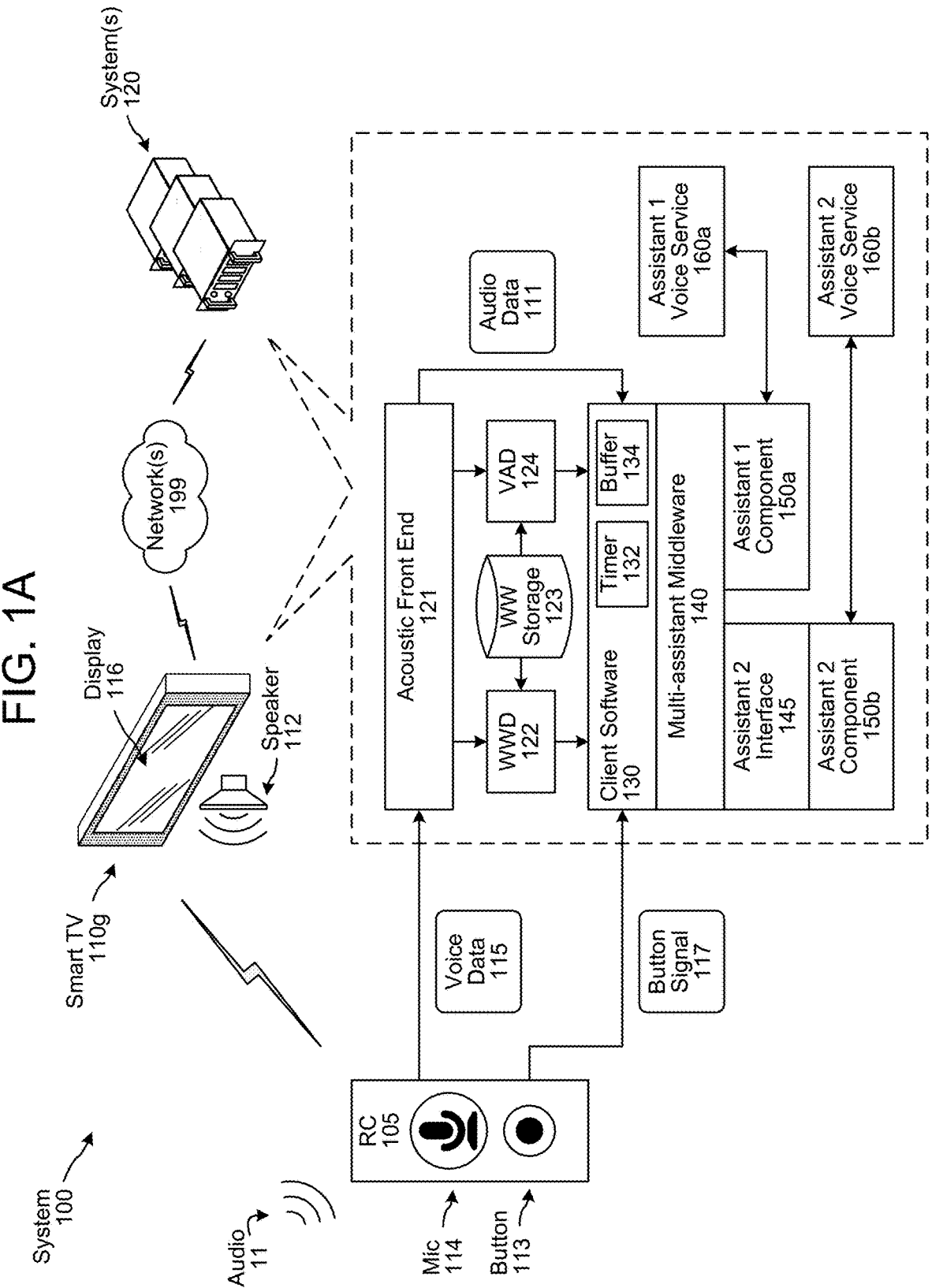

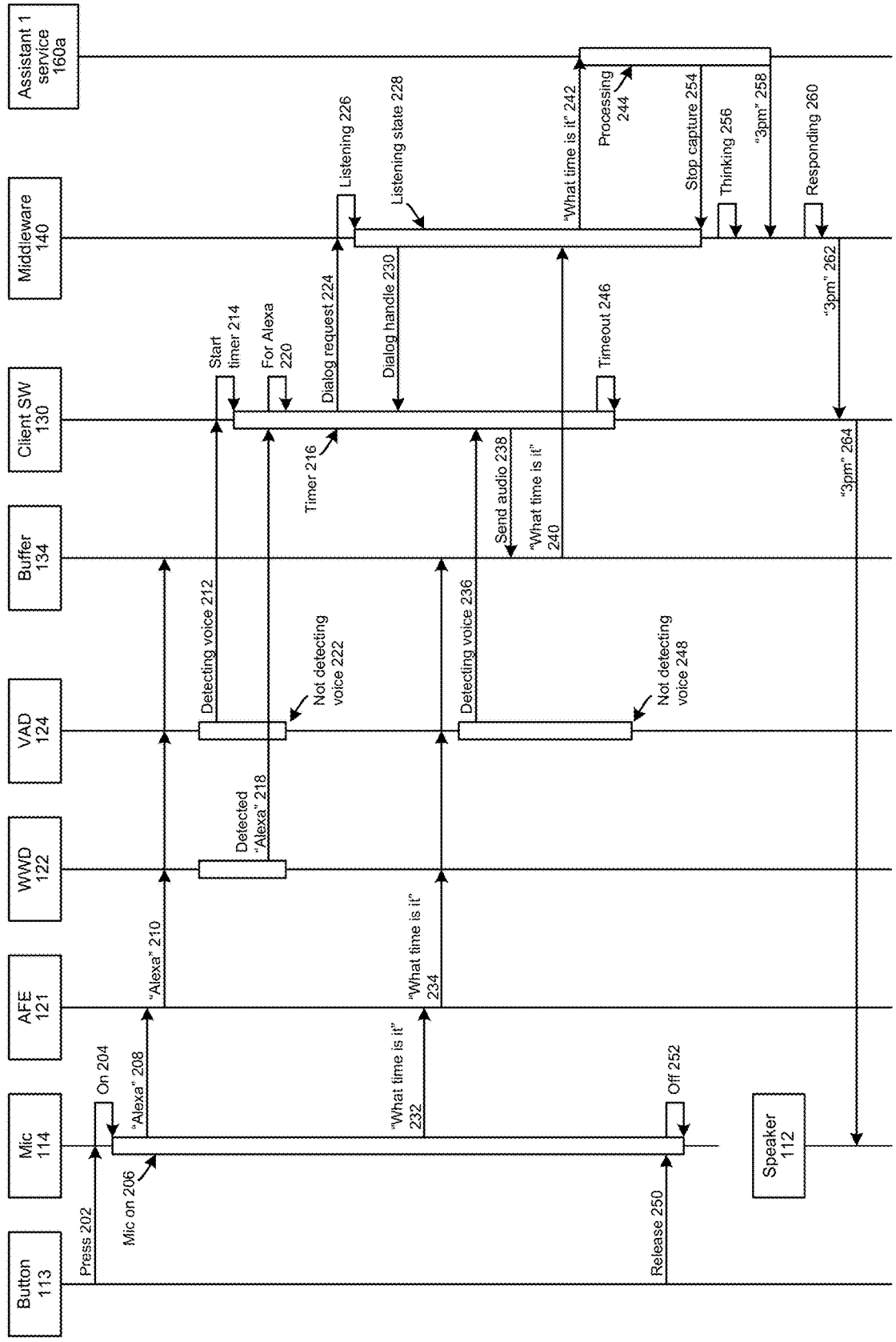

DEFAULT ASSISTANT FALLBACK IN MULTI-ASSISTANT DEVICES

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1A is a conceptual diagram illustrating components of a multi-assistant system with default assistant fallback, according to embodiments of the present disclosure.

FIG. 2 is a signal flow diagram illustrating example operations of a multi-assistant system processing an utterance that includes a wakeword, according to embodiments of the present disclosure.

DETAILED DESCRIPTION

Figure 1B:
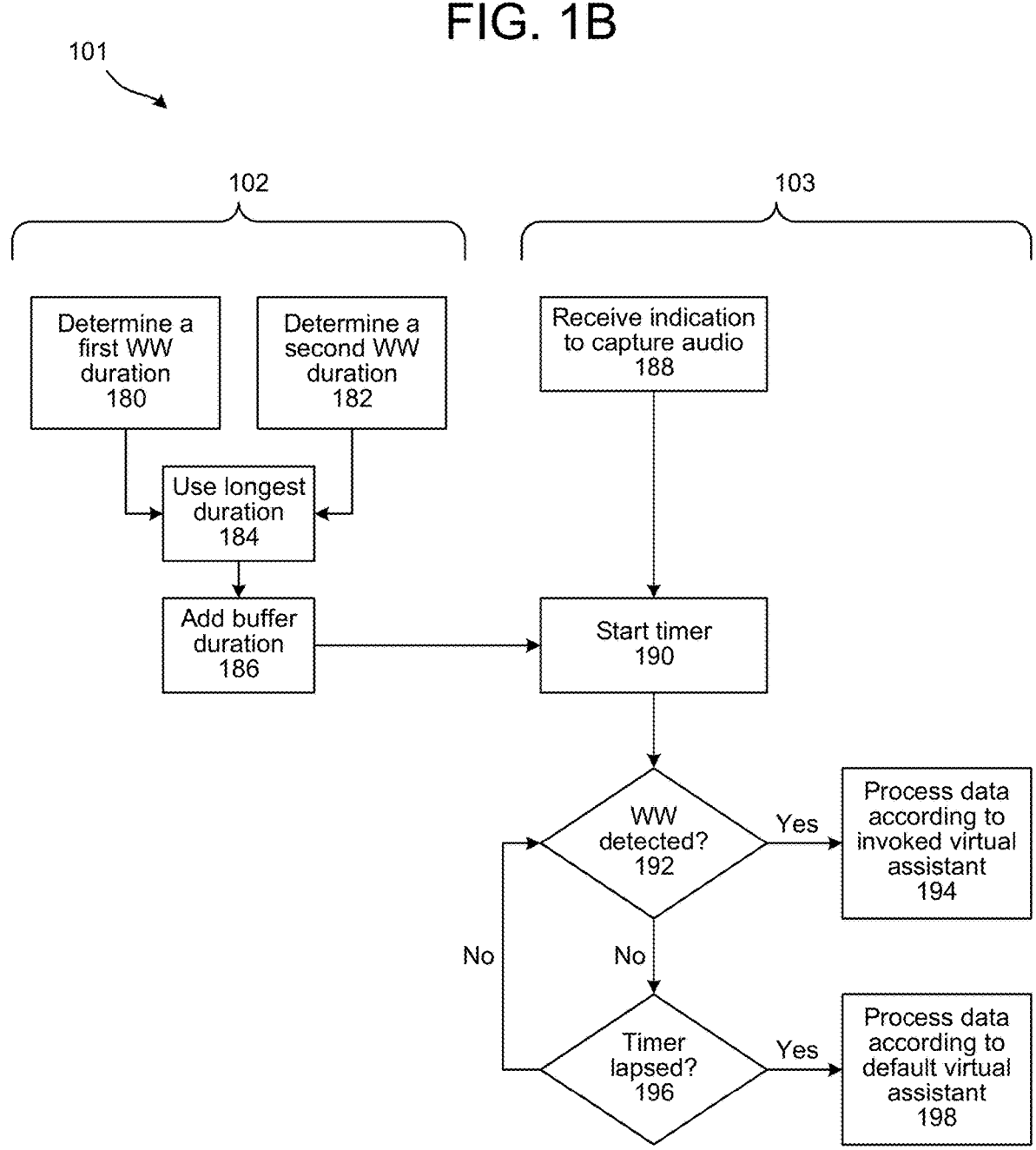
FIG. 1B is flowchart illustrating an example method of default assistant fallback in the multi-assistant system, according to embodiments of the present disclosure.

Speech processing systems and speech generation systems have been combined with other services to create virtual "assistants" that a user can interact with using natural language inputs such as speech, text inputs, or the like. The assistant can leverage different computerized voice-enabled technologies. Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system, sometimes referred to as a spoken language understanding (SLU) system. Natural language generation (NLG) includes enabling computers to generate output text or other data in words a human can understand, such as sentences or phrases. Text-to-speech (TTS) is a field of computer science concerning transforming textual and/or other data into audio data that is synthesized to resemble human speech. ASR, NLU, NLG, and TTS may be used together as part of a speech-processing system. The virtual assistant can leverage the speech-processing system as well as additional applications and/or skills to perform tasks for and/or on behalf of the user.

Some voice-controlled devices can provide access to more than one speech-processing system, where each speech-processing system may provide services associated with a different virtual assistant. In such multi-assistant systems, a speech-processing system may be associated with its own wakeword. Upon detecting a representation of a wakeword in an utterance, the device may send audio data representing the utterance to the corresponding speech-processing system.

On some devices, a user may activate a microphone by pressing a button; for example, on a remote control of a television or a steering wheel of a vehicle. Upon activation of the microphone, the device may begin processing audio to identify a representation of a wakeword. If the device detects a wakeword, it may send the audio data to the corresponding speech-processing system for processing. In some cases, the device may have a default assistant that a user may invoke without a wakeword; for example, by simply speaking an utterance after activating the microphone. If the device has multiple assistants enabled, however, the device may need to process the utterance to determine that no wakeword was detected before sending the audio data to the default speech-processing system. Waiting until the end of the utterance to select a speech-processing system for processing may introduce a delay that may increase latency perceived by the user.

The systems and method described herein can reduce the user-perceived latency using one or more mechanisms to determine that an utterance includes no wakeword. For example, upon receiving an indication to begin receiving audio data (e.g., a button press or other gesture) the device may start a timer. The device may determine a speaking duration of one or more wakewords recognized by the device (e.g., an amount of time it may take to utter the wakeword in 95% of cases). The device may use the timer to determine that a duration of time corresponding to a longest speaking duration of the wakewords (and in some cases including an additional margin duration of time) has elapsed; and, if no wakeword has been detected during that time, the device may determine that the utterance is intended for the default assistant, and release the audio data for processing by the corresponding speech-processing system (e.g., without waiting for an end of speech). Thus, the default speech-processing system may begin processing the utterance within, for example, a second or two of the beginning of speech rather than after completion of the utterance.

In some implementations, a device may include a voice activity detector (VAD). A VAD may be a hardware and/or software component that can receive audio data and indicate whether the audio data includes features consistent with a human voice. The device may start the timer upon the VAD indicating the presence of human speech in audio data. In devices where the user presses a button to activate the microphone before speaking, incorporating a VAD may improve accuracy by disregarding silence after a button press and only starting the timer once voice activity is detected. This may prevent the device from timing out while a user is speaking a wakeword and/or wakeword-less speech input, but before the wakeword detector has indicated a wakeword detection.

In some implementations, the device may process the detection signal(s) from the VAD to make an early determination that the utterance does not include a wakeword. For example, the VAD may indicate a brief segment of speech, followed by a gap, and then further speech. The device may have timing information for one or more wakewords and determine that none of the wakewords include such a gap. Thus, the device may determine absence of a wakeword even before the timer has elapsed and release audio data for processing by the default speech-processing system, thereby reducing user-perceived latency even further.

These and other features of the disclosure are provided as examples, and maybe used in combination with each other and/or with additional features described herein.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Figure 13:
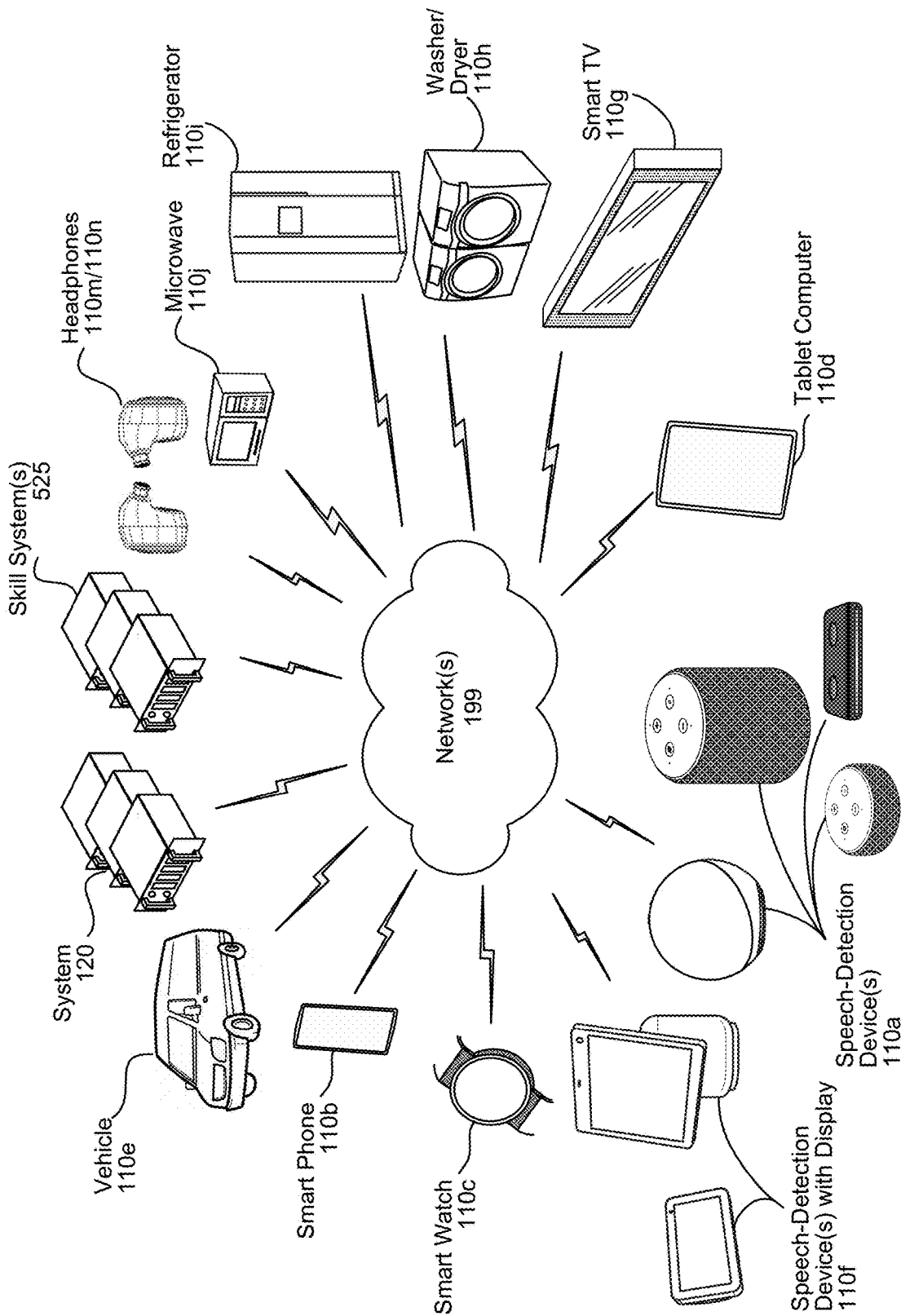
FIG. 13 illustrates an example of a computer network for use with the overall system, according to embodiments of the present disclosure.

FIG. 1A is a conceptual diagram illustrating components of a multi-assistant system 100 with default assistant fallback, according to embodiments of the present disclosure. The system 100 may include a device 110, such as the smart TV 110g pictured, in communication with one or more remote systems 120 via one or more computer networks 199. FIG. 13 illustrates other example devices 110 that may be part of a multi-assistant system 100 such as a vehicle 110e, a smart watch 110c, a speech-detection device with display 110f, etc. The device 110 may include various components for input and output such as one or more displays 116, one or more speakers 112, etc. The device 110 may be operated in part using a remote control 105. In some implementations, the remote control 105 may be separate from the device 110 (e.g., such as a remote control for the smart TV 110g), may be a separate device 110 (e.g., such as a smart phone 110b running a remote control app), and/or may be attached to and/or integrated within the device 110 (e.g., such as steering wheel-mounted controls of the vehicle 110e). The remote control 105 may include one or more microphones 114 and/or buttons 113. In some implementations, the button 113 may be touch sensitive (e.g., non-mechanical), a softkey (e.g., programmable to have different functions or trigger different operations), and/or be presented via a touchscreen, etc. At least one of the buttons 113 may activate the microphone 114 and allow the system 100 to receive verbal commands and requests from a user. In some implementations, the system 100 may detect various gestures (e.g., non-physical movements) that indicate the system 100 is to receive an input such as audio 11. The system 100 may respond to the user by various means including synthesized speech (e.g., emitted by the speaker 112) conveying a natural language message. Various components of the system 100 as described with reference to FIG. 1A (as well as with reference to FIGS. 5 and 6) may reside in the remote control 105, the device 110, and/or the system 120. In some implementations, various components of the system 100 may be shared, duplicated, and/or divided between the remote control 105, the device 110, and/or the system 120.

Figure 5:
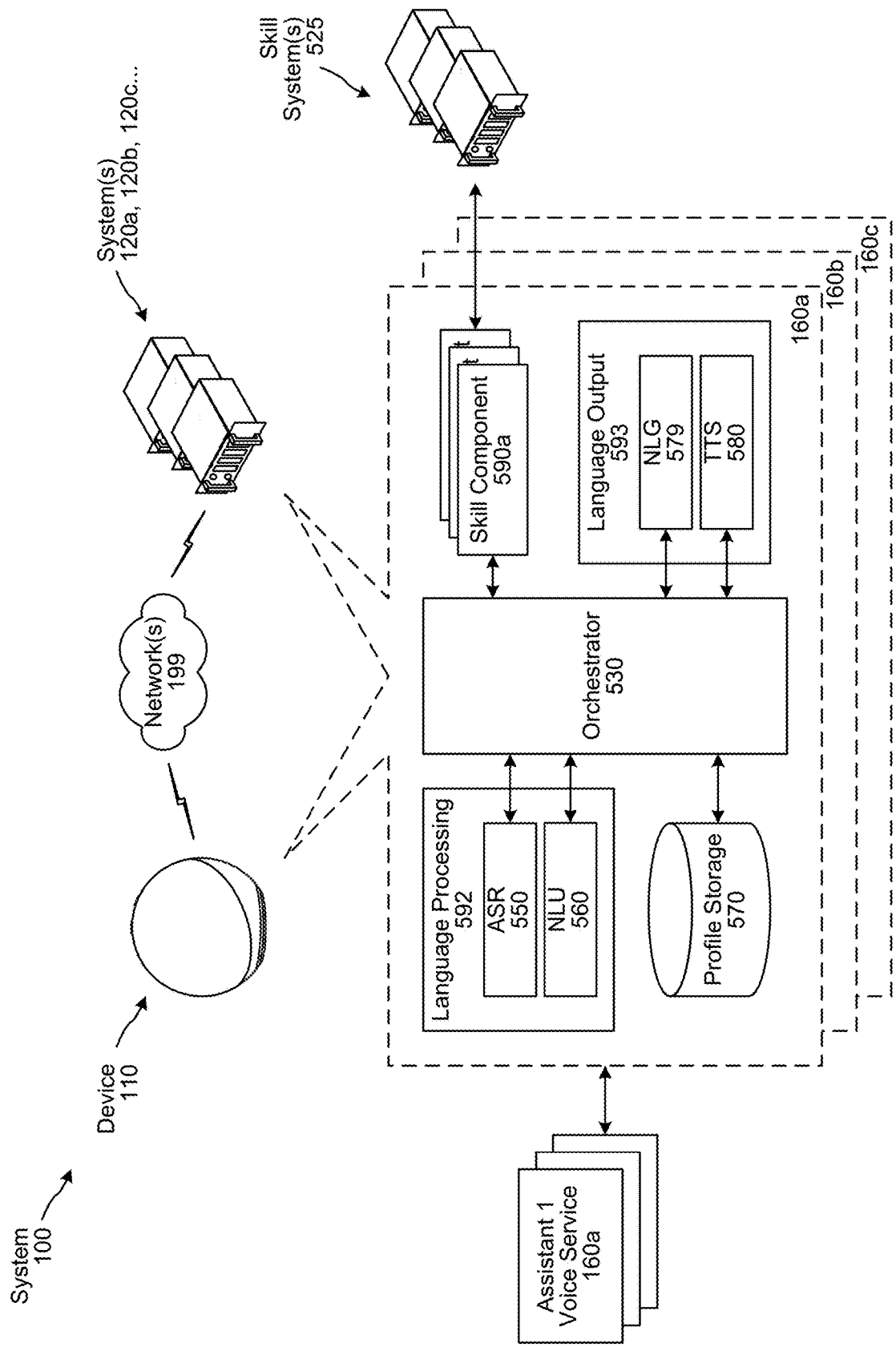
FIG. 5 is a conceptual diagram illustrating components that may be included in a first example implementation of the multi-assistant system, according to embodiments of the present disclosure.
Figure 6:
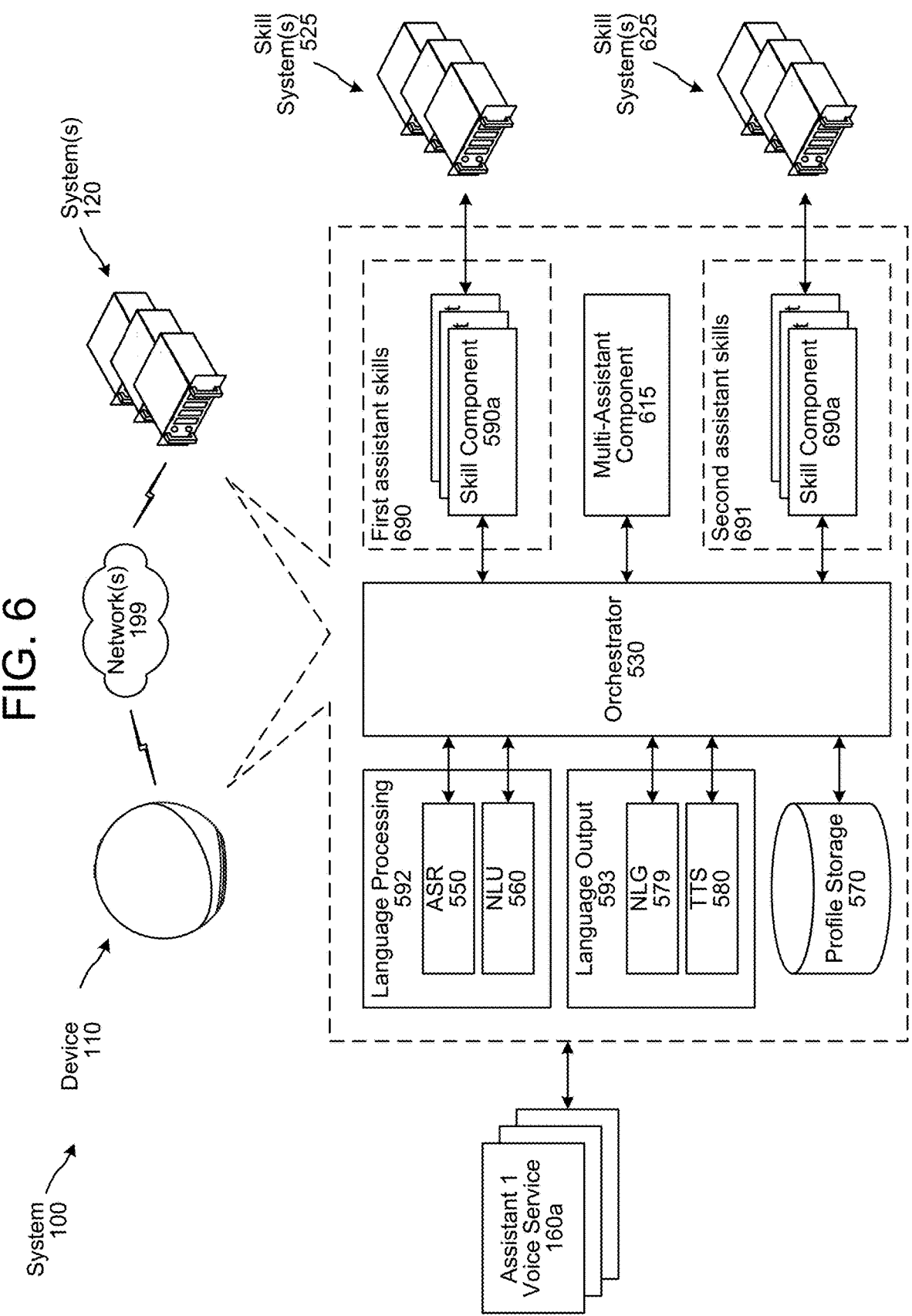
FIG. 6 is a conceptual diagram illustrating components that may be included in a second example implementation of the multi-assistant system, according to embodiments of the present disclosure.

The device 110 may provide the user with access to one or more virtual assistants. A virtual assistant may be configured with certain functionalities that it can perform for and/or on behalf of the user. A virtual assistant may further be configured with certain identifying characteristics that may be output to the user to indicate which virtual assistant is receiving input (e.g., listening via the microphone 114), processing (e.g., performing ASR, NLU, and/or executing actions), and/or providing output (e.g., speaking via TTS). A user may invoke a particular virtual assistant by, for example, speaking a wakeword associated with that virtual assistant. The system 100 may determine which virtual assistant is to handle the utterance, and process the utterance accordingly; for example, by sending data representing the utterance to the particular speech processing system corresponding to the virtual assistant as illustrated in FIG. 5 and/or processing the utterance using a configuration corresponding to the virtual assistant as illustrated in FIG. 6.

The system 100 may be configured with a default virtual assistant such that if the user utters a command or request without a wakeword, the system 100 will determine that the utterance should be handled by the default virtual assistant. For example, the device 110 may include a button 113 that may activate the microphone 114 and indicate to the system 100 to begin receiving audio 11 and processing the resulting audio data. When the user selects the button 113, the microphone 114 may receive audio 11, and the remote control 105 may send voice data 115 to the device 110. In some implementations, however, the button 113 and/or microphone 114 may be on or otherwise physically integrated with the device 110 itself. The system 100 may process the audio data to determine whether the audio data includes representations of one or more wakewords. If the system 100 does not detect any known wakewords in the audio data, the system 100 may determine that the utterance is intended for the default virtual assistant.

The time between a user speaking a command to the system 100 and receiving a response from the system 100 may be referred to as the user-perceived latency. User-perceived latency is an important system metric because it relates directly to a user's experience. That is, a user experiencing high latency may become frustrated and reduce their use of the system 100. Thus, any steps that can be taken to reduce the user-perceived latency will improve the user experience and increase use.

In order to reduce the user-perceived latency, the system 100 may attempt to quickly determine whether or not a user has spoken a wakeword. For example, an utterance that begins with a wakeword may be 5 seconds long, while the wakeword may be spoken at the beginning of the utterance, perhaps in the first second. Thus, if the system 100 determines after the first second that no wakeword is spoken, it may begin processing the audio data consistent with the default virtual assistant. In contrast, if the system 100 processes audio data for the entire utterance before determining that the utterance is intended for the default virtual assistant, the user-perceived latency may be four second longer. Therefore, the system 100 may include features for determining early in the utterance whether or not a wakeword has been spoken, and promptly sending the audio data (e.g., in a streaming fashion) for speech processing corresponding to the default or indicated virtual assistant.

FIG. 1A illustrates various components of the system 100 that may be configured to make an early determination regarding the presence of one or more wakewords in a received utterance. The various components may be software, logic on separate chips, separate dies on a system on chip (SoC), etc. The components may be embodied in a single executable where an individual component may be process or subroutine of the executable. Boxes abutting each other in the drawings (e.g., the client software 130 and the multi-assistant middleware 140) indicate that the components represented by the boxes may interface directly. Arrows may indicate directions of signal and/or data flow.

The system 100 may include an acoustic front end (AFE) 121 that may receive the voice data 115 from the microphone 114 and generate audio data 111 for processing by downstream components (e.g., ASR, NLU, etc.). The AFE 121 may also provide a representation of the voice data 115 to one or more wakeword detectors 122 and/or a voice activity detector (VAD) 124. The AFE 121 may include processing to filter the voice data 115. For example, the AFE 121 may perform echo cancelation, noise suppression, beamforming, high- and/or low-pass filtering, etc. The AFE 121 may output both raw audio data and audio data processed using one or more of the aforementioned techniques. The AFE 121 may stream the audio data 111 to the wakeword detector(s) 122, the VAD 124, and/or a buffer 134. The buffer 134 may be a memory or storage configured to store the audio data 111 unless or until the system 100 determines a virtual assistant for handling the audio data 111.

The wakeword detector 122 can receive the audio data 111 from the AFE 121 and process it to detect the presence of one or more wakewords. In some implementations, the system 100 may include multiple wakeword detectors 122 (e.g., corresponding to different wakewords and/or virtual assistants). In some implementations, the system 100 may include a wakeword detector 122 configured to recognize multiple wakewords.

The wakeword detector 122 may be a hardware or software component. For example, the wakeword detector 122 may be executable code that may run without external knowledge of other components. The wakeword detector 122 may be a library that integrates with an application (e.g., the client software 130), where the library contains a description or descriptions (e.g., model parameters) corresponding one or more wakewords. In some implementations, the system 100 may store model parameters and/or other information about wakewords in the wakeword storage 123. The wakeword storage may be volatile, semi-volatile, or non-volatile memory configured to store and output wakeword representational data for the wakeword detector(s) 122. The wakeword storage 123 may include other data and/or metadata for a wakeword, such as wakeword durations For example, the wakeword storage 123 may include timing information for a wakeword, such as a typical speaking length (e.g., 0.8 seconds, 1.1 seconds, etc.).

The wakeword detector 122 may, in some implementations, output a signal when a representation of a wakeword is detected; for example, the wakeword detector 122 may output a logic 0 when no wakeword is detected, transitioning to a logic 1 if/when a wakeword is detected. The wakeword detector 122 may output the wakeword detection signal to the client software 130 and/or other components of the system 100. For example, in some implementations, the wakeword detector 122 may output a wakeword detection signal to the AFE 121, in response to which the AFE 121 may begin generating and streaming the audio data 111 for processing by the system 100. In some implementations, the wakeword detector 122 may output other metadata upon detecting a wakeword. The other metadata may include a confidence score associated with the detection, fingerprinting (e.g., whether the audio data 111 included a fingerprint signal on the portion representing the wakeword to indicate that the wakeword was output from a media device during, for example, a commercial or other mass media event), and/or other metrics.

The wakeword detector 122 of the device 110 may process the audio data 111, representing the audio 11, to determine whether speech is represented therein. The device 110 may use various techniques to determine whether the audio data 111 includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 122 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 122 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

The VAD 124 may be a hardware and/or software component configured to detect the presence of voice-like audio in the audio data 111. The VAD 124 may determine whether voice activity may be present in the audio data based on, for example, the frequency/energy content of the audio data. For example, the VAD 124 may output an indication of voice activity based on detecting energy in the range of 200-4,000 Hz. The output may be a high/low signal indicating that voice activity is or is not detected. In some implementations, the VAD 124 may be a part of the AFE 121, the client software 130, or a standalone hardware or software component. The VAD 124 may provide a VAD signal to the client software 130 and/or other components of the system 100.

The VAD signal may be used to, for example, determine that a user has begun speaking; for example, following detection of a gesture such as a press of the button 113. A user may press the button 113 and pause for some time before speaking. In some implementations, the system 100 can use the VAD 124 and the VAD signal it produces as a trigger to start the timer 132 (e.g., as an alternative or in addition to starting a timer when a button signal 117 is received). The client software 130 is configured to wait 1.2 s before defaulting to the default virtual assistant if no known wakewords are detected, but a user does not begin speaking until 0.5 s after pressing the button 113, the wakeword detector 122 may not have time to detect a wakeword longer than ~0.7 s before the system 100 defaults to the default virtual assistant. The timer 132 may be configured with an added delay to allow for a delay between receiving the button signal 117 and the beginning of speech; however, the added delay may add to user-perceived latency.

In some implementations, however, the client software 130 may start the timer 132 upon detection of voice activity. For example, the user may press the button 113, and the system 100 may begin generating audio data. After some time, perhaps 0.5 s, the user may begin speaking. The VAD 124 may detect the voice activity and send a resulting VAD signal to the client software 130. The client software 130 may start the timer 132. After a predetermined time (e.g., a threshold amount of time as measured following detection of voice activity), the client software 130 may determine whether the wakeword detector 122 has indicated a detection of a representation of a wakeword in the audio data 111. For example, the threshold duration of time may be equal to a length of the longest wakeword configured for use on the device, plus a margin duration of time. The wakeword length may be a speaking length of the wakeword; for example, the TP95, which is the amount of time within which 95% utterances of the wakeword would fall. Typical TP95 values for various wakewords may range from, for example, 0.5 s to 2.0 s; however, most wakewords may fall within a range of 1 s+/−200 ms. The margin duration may allow for extra time for a user to begin speaking after a button press (e.g., 250-500 ms), or to allow for elongated pronunciations of the wakeword (e.g., 100-200 ms). The margin duration may be set proportionally to the wakeword duration (e.g., an additional 10%, 15%, 20% of time, etc.), or may be set as an absolute amount of time (e.g., 100, 200, 300 ms, etc.). The wakeword length and/or margin duration may be determined using example utterances received and/or stored by the system 100.

Figure 3:
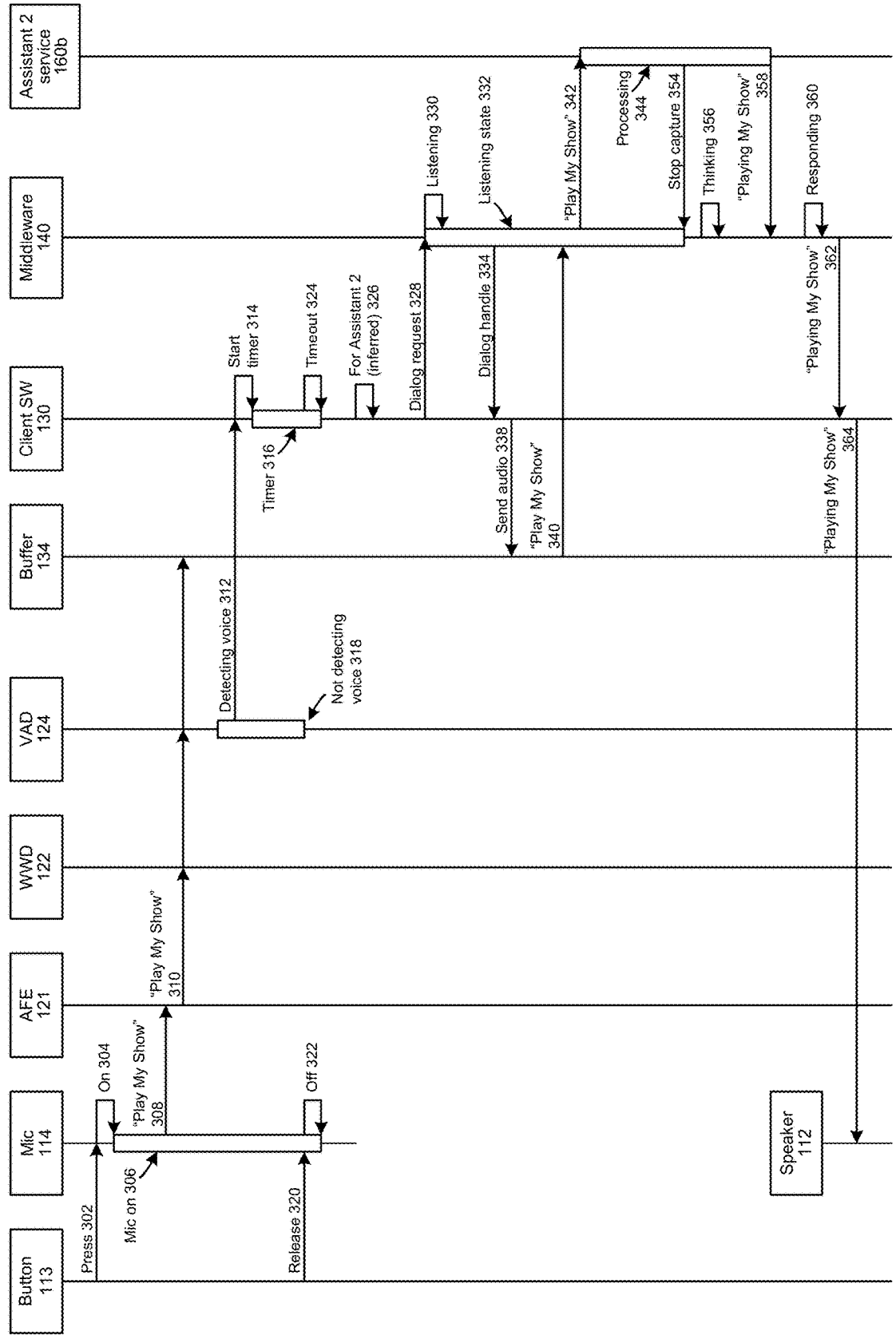
FIG. 3 is a signal flow diagram illustrating first example operations of default agent fallback in a multi-assistant system processing an utterance that does not include a wakeword, according to embodiments of the present disclosure.

If the client software 130 determines that the one or more wakewords are undetected during the threshold duration of time, the client software 130 may default to the default virtual assistant. In this manner, the system 100 can reduce the amount of user-perceived latency experienced by a user who begins speaking shortly after pressing the button 113. FIG. 3, described below, illustrates an example of early default virtual assistant determination using a timer started based on a VAD signal.

Figure 4:
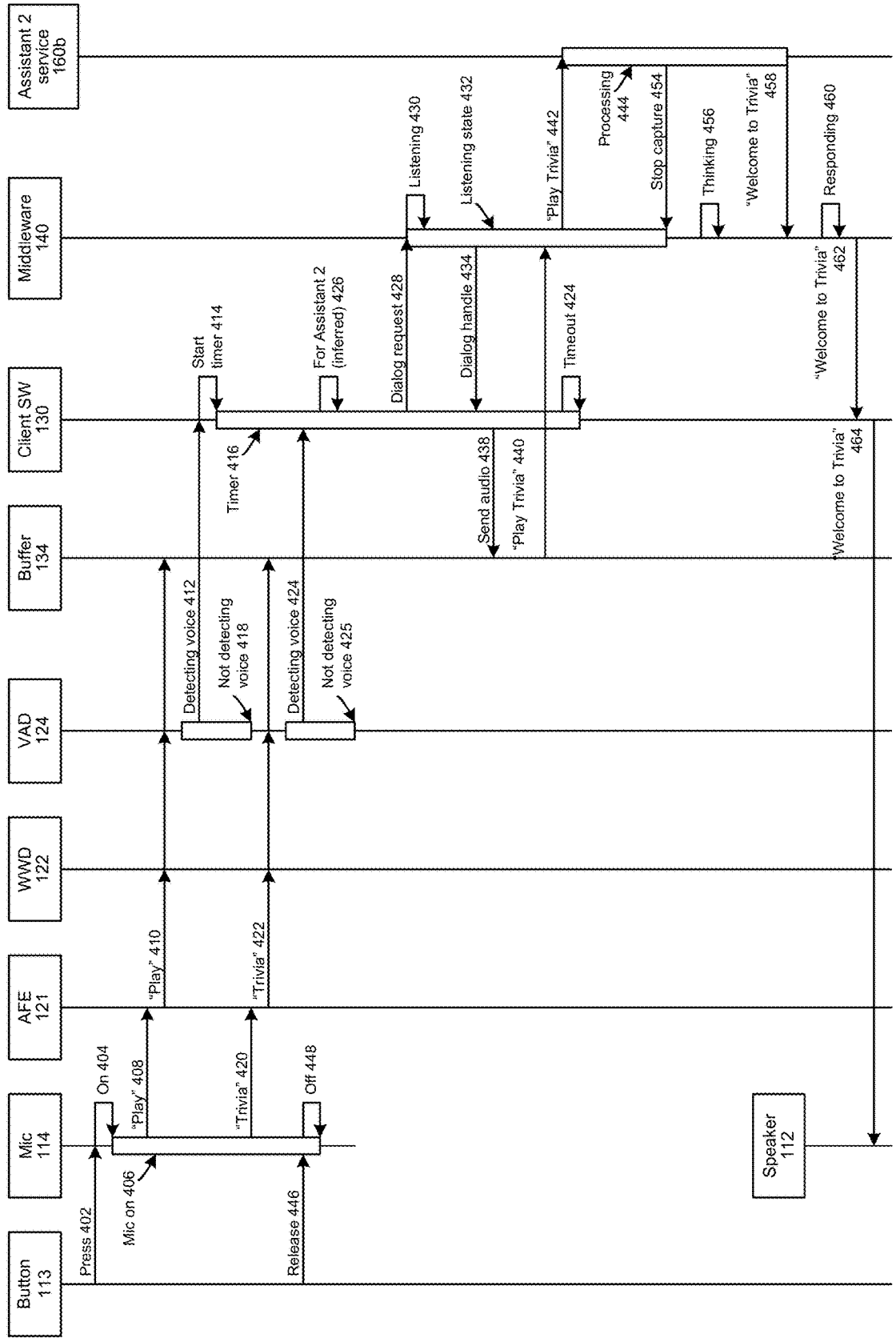
FIG. 4 is a signal flow diagram illustrating second example operations of default agent fallback in a multi-assistant system processing an utterance that does not include a wakeword, according to embodiments of the present disclosure.

In some implementations, the system 100 may perform a more sophisticated analysis of the VAD signal. For example, speech may include silent moments between and within words. A VAD 124 may have a rapid response, on the order of 10 ms. Thus, a VAD signal corresponding to speech may include brief periods (e.g., on the order of tens or hundreds of milliseconds) where the VAD 124 may indicate no voice activity. Similarly, some wakewords may have a VAD signature that is continuous, while others may have gaps in the VAD signal where no voice activity is detected. The wakeword storage 123 may store VAD signatures for wakewords. The VAD 124 and/or the client software 130 may use the VAD signatures to determine that the VAD signal is inconsistent with wakewords enabled for the system 100. For example, the VAD signatures for all enabled wakewords represent continuous voice activity detection for the duration of the wakeword, and the wakewords may all have a duration of between 1 s and 1.25 s. Thus, if the VAD 124 detects a gap in voice activity after, for example, 200 or 300 ms of detected voice activity, the system 100 may determine that the gap is inconsistent with enabled wakewords, and make an early determination (e.g., before the timer 132 has elapsed) that the user has not spoken a wakeword at the beginning of speech. The system 100 may thus determine that the utterance is intended for the default virtual assistant. FIG. 4, described below, illustrates an example of early default virtual assistant determination based on VAD signals.

In some implementations, the VAD signatures may include additional description of VAD signal gaps corresponding to a wakeword. For example, a wakeword may have a first segment having 300 ms+/−60 ms of voice activity detected, followed by a second segment having 100 ms+/−20 ms of no voice activity detected, followed by a third segment having 400 ms+/−160 ms of voice activity detected. Another wakeword may have additional segments of voice activity/no voice activity described. The system 100 may, using such VAD signatures, make an early determination that voice activity detected/no voice activity detected segments do not match enabled wakewords, and thus determine that the utterance is intended for the default virtual assistant. In some implementations, the client software 130 or other component may be configured with a trained model, such as a recurrent neural network or classifier, configured to predict whether a VAD signal from the VAD 124 matches enabled wakewords. Such a model may be trained using labeled sample data comprised of speech with and without wakewords.

The device 110 (and/or other components of the system 100) may execute client software 130. The client software 130 may receive detection signals from the wakeword detector(s) 122 and/or VAD 124. The client software 130 may also receive audio data 111 from the AFE 121. The client software 130 may include or interface with a timer 132. The client software 130 may use the timer 132 to determine when to default to a default virtual assistant; for example, in absence of a wakeword signal received prior to a threshold duration of time elapsing. The client software 130 may control a buffer 134 configured to store audio data 111 from the AFE 121, and send the audio data from the buffer 134, via the multi-assistant middleware 140 to a voice service corresponding to a virtual assistant selected to process the utterance. An example operation of the client software 130 and the system 100 is described in additional detail below with reference to FIG. 1B.

The multi-assistant middleware 140 may include software and/or logic configured to control the invocation of the virtual assistants and enforce rules to ensure proper receipt and transmission of user data. For example, the multi-assistant middleware 140 may control the creation of a dialog instance (e.g., a session) between a user and a virtual assistant. A dialog instance may be a singleton, meaning that the system 100 may only have a single instance active at a given time. In other words, a user may only be in contact with one virtual assistant at a time. Thus, data transferred between the user (e.g., the user's device 110) and a first virtual assistant is inaccessible to other virtual assistants.

When the client software 130 receives the button signal 117 (or other gesture), the client software 130 may begin receiving audio data 111 and storing it in the buffer 134. Upon determining a virtual assistant for handling the utterance, the client software 130 may send a request to the multi-assistant middleware 140 to initiate a dialog between the user and the determined virtual assistant. The multi-assistant middleware 140 may deny the request if there is an existing active dialog (e.g., another virtual assistant is listening or speaking via the device 110). If the multi-assistant middleware 140 grants the request, it may provide a dialog identifier to the client software 130. The client software 130 may use the dialog identifier to cause the multi-assistant middleware 140 to allow transfer of audio data from the buffer 134 to the determined virtual assistant. Thus, in absence of the multi-assistant middleware 140 granting the dialog request and providing the dialog identifier, the client software 130 may be unable to transmit audio data to a virtual assistant (or anywhere else).

The functions of a virtual assistant may be accessed via an assistant voice service 160. The assistant 1 voice service 160a and the assistant 2 voice service 160b (collectively, "assistant voice services 160") may correspond to a first virtual assistant and a second virtual assistant, respectively. An assistant voice service 160 may represent language processing components, skill components, language output components, and/or associated components as described in further detail below with reference to FIGS. 5 and 6. In various implementations, the components represented by the assistant voice services 160 may reside on the device 110 or the system 120, or divided or shared between the two. In some implementations, the assistant 1 voice service 160a may correspond to one or more components of a first system 120a and the assistant 2 voice service 160b may correspond to one or more components of a second system 120b, etc. In some implementations, multiple assistant voice services 160 may correspond to a single system 120, where configuration for each virtual assistant are stored in a multi-assistant component and used to process a user command and/or request using settings and/or resources corresponding to the determined virtual assistant.

The multi-assistant middleware 140 may, when a dialog request is granted, send audio data to the determined assistant voice service 160 via an assistant component 150a or 150b (collectively, "assistant components 150"). For example, the multi-assistant middleware 140 may send and receive data to and from the assistant 1 voice service 160a via an assistant 1 component 150a. The multi-assistant middleware 140 may send and receive data to and from the assistant 2 voice service 160b via an assistant 2 component 150b. In some cases, the multi-assistant middleware 140 may interface with an assistant component 150 via an assistant interface 145. The assistant interface 145 may translate data transferred between the multi-assistant middleware 140 and the assistant component 150. For example, the system 100 may include any number of assistant components 150 communicating with respective assistant voice services 160. In some cases, an assistant voice service 160 and assistant component 150 may be configured to interface with the multi-assistant middleware 140 directly by using a shared communication protocol, APIs, or other means of exchanging data. In some cases, however, the system 100 may include an assistant interface 145 to facilitate integration of, for example, assistant component and voice services corresponding to third-party virtual assistants developed with/for different communication protocols.

FIG. 1B is flowchart illustrating an example method 101 of default assistant fallback in the multi-assistant system 100, according to embodiments of the present disclosure. The method 101 may include offline stages 102 (e.g., that may be performed prior to receiving an indication to begin capturing audio) as well as runtime stages 103 (e.g., that may be performed in response to receiving an indication to begin capturing audio and/or as part of processing the captured audio). The method 101 may be performed using various components of the system 100 described herein; for example, with reference to FIGS. 1A, 1B, 5, and 6, etc.

The method 101 may include determining (180) a first wakeword speaking duration; that is, an expected speaking length of a first wakeword, such as "Alexa." The first wakeword speaking duration may be, for example, 0.8. The wakeword duration may correspond to, for example, a time in which 90% (or 95%, 99%, etc.) of speakers say the wakeword. The method 101 may include determining (182) a second wakeword speaking duration. The second wakeword may be, for example, "Hi, Computer," and may have a speaking duration of 1.1 s. In some implementations, the method 101 may include determining speaking durations for additional wakewords enabled for use with the system 100. The method 101 may include determining (184) a longest speaking duration of all the enabled wakewords. In this example, the longest wakeword speaking duration may be 1.1 s. The method 101 may include adding (186) to the longest wakeword speaking duration a margin duration, such as an amount of time equal to 10%, 15%, 20%, etc. of the longest wakeword speaking duration. The total duration for use in the timing operations of the method 101 may thus be approximately 1.3 s. The offline stages 102 may be performed prior to and/or during the runtime stages. For example, in some implementations, the system 100 may calculate the total duration prior to receiving an indication to capture audio (e.g., at a stage 188). In some implementations, the system 100 may calculate the total duration after receiving the indication to capture audio but before the determination to default, based on an elapsed time, to the default virtual assistant (e.g., at a decision block 196).

The method 101 may include the runtime stages 103, which may begin by receiving (188) an indication to capture audio. The indication may include a button press, voice activity detection, or other signal indicating to the system 100 to being capturing audio, generating audio data, and processing the audio data. The method 101 may include starting (190) a timer. In some implementations, the system 100 may start the timer upon receiving the indication to capture audio; for example, the button press. In some implementations, the system 100 may wait until voice activity is detected subsequent to the button press to begin start the timer. The system 100 may set the timer to run until the total duration calculated at the stage 186 has lapsed. While the timer is running, the system 100 may process the audio data to determine (at a decision block 192) a potential representation of one or more wakewords (e.g., the wakewords whose durations were determined in the stages 180 and/or 182). If the system 100 detects a wakeword ("yes" at 192), the method 101 may include processing (194) the audio data according to the invoked virtual assistant; that is, the virtual assistant corresponding to the detected wakeword. The system 100 may send the audio data to one or more components associated with the determined virtual assistant for processing. If, however, the system 100 does not detect a wakeword ("no" at 192), the method 101 may include determining (196) whether the timer has lapsed. If the timer has not lapsed ("no" at 196), the method 101 will return to the decision block 192 and continue processing the audio data to detect a representation of a wakeword. If the timer has lapsed ("yes" at 198), the method 101 may include processing the audio data according to a default virtual assistant.

The system 100 may then process the audio data according to the determined virtual assistant, and perform one or more actions responsive to the audio data.

FIG. 2 is a signal flow diagram illustrating example operations of a multi-assistant system 100 processing an utterance that includes a wakeword, according to embodiments of the present disclosure. In the example operations illustrated in FIG. 2, the system 100 starts a timer upon detection of voice activity following a button press, and detects a wakeword prior to time out. The system 100 thus sends the audio data for processing consistent with the virtual assistant associated with the detected wakeword via the assistant 1 voice service 160*a* (e.g., via the assistant 1 component 150*a*, not pictured).

The operations may begin with a detection (202) of a press of the button 113 (or other gesture). In response to the button press, the microphone 114 may turn on (204) and begin capturing audio. The microphone 114 may remain on and capturing audio (206) until the button 113 is released. In some implementations, the microphone 114 may be turned off by downstream components of the system 100 in response to, for example, detecting an end of speech by the AFE 121 and/or ASR components. The microphone 114 may be a passive electronic component, thus turning the microphone 114 on or off may be accomplished by connecting/disconnecting the microphone 114 from the AFE 121, turning the AFE 121 (or component thereof such as a microphone preamplifier) on or off, controlling whether the AFE 121 is generating audio data representing captured audio, etc. When the microphone 114 is activated, the AFE 121 may receive (208) an analog audio signal from the microphone and convert it to audio data, which it may in turn send (210) in parallel to the wakeword detector 122, the VAD 124, and/or the buffer 134. In this example, the AFE 121 has received an audio signal representing the word "Alexa."

The VAD 124 may receive the audio data and may begin detecting voice activity in the audio and send (212) a VAD signal indicating that it has begun detecting speech. The client software 130 may receive the VAD signal and start (214) a timer. The timer may have been preconfigured for a threshold duration equal to a longest speaking duration of wakewords enabled for the device 110/system 100 plus a margin duration. The timer may continue to run (216) for the threshold duration.

The wakeword detector 122 may receive the audio data and process it to determine whether the audio data includes a potential representation of any of the enabled wakewords. The system 100 may include one or more wakeword detectors 122, and a wakeword detector may be configured to detect one or more wakewords. In the example shown in FIG. 2, the wakeword detector 122 detects the wakeword "Alexa," and sends (218) a wakeword detection signal. The client software 130 may receive the wakeword detection signal (e.g., in this example, prior to timeout of the timer), and determine (220) that the utterance is to be processed using an assistant voice service 160 corresponding to the detected wakeword; in this case, "Alexa" may correspond to the assistant 1 voice service 160*a*. In response to determining that the utterance is to be processed using the assistant 1 voice service 160*a*, the client software 130 may send (224) a dialog request to the multi-assistant middleware 140. In this example, the multi-assistant middleware 140 may grant (226) the request, and update the system 100 state to a "listening" state (228). While the system 100 is in a listening state, the multi-assistant middleware 140 may reject other dialog requests. Upon granting the request, the multi-assistant middleware 140 may send (230) an indication representing a dialog handle back to the client software 130. The dialog handle may include data such as a dialog identifier, a virtual assistant identifier, etc., that the client software 130 may use to request speech processing of the audio data using the assistant 1 voice service 160*a*. The client software 130 may cause (238) the buffer 134 to send (240) the audio data stored therein to the multi-assistant middleware 140, which may send (242) the audio data to the assistant 1 voice service 160*a*. The assistant 1 voice service 160*a* may (e.g., using the language processing components described with reference to FIGS. 5 and 6) process (244) the audio data; for example, using ASR, NLU, one or more skills, and/or TTS to perform an action indicated by the utterance including generating a response.

The microphone 114 may keep receiving audio and sending (232) the audio signal to the AFE 121. The AFE 121 may process the audio signal and generate audio data, which it may send (234) to the wakeword detector 122, VAD 124, and buffer 134. The VAD 124 may have indicated (222) that no voice activity was detected for a time following "Alexa"; for example, due to a pause in the speech between the wakeword and the request. Upon receipt of the audio data representing the speech ("What time is it?"), the VAD 124 may again detect voice activity and send (236) a VAD signal indicating the detection. Following the speech, but before the stop capture command (254), the VAD 124 may determine (248) that it is no longer detecting voice activity. The system 100 may detect (250) the button release and deactivate (252) the microphone (e.g., the AFE 121 may no longer generate audio data and/or send it to other components). After the threshold duration has elapsed, the client software 130 may determine (246) that the timer has timed out.

The assistant 1 voice service 160a may continue processing (244) the audio data to, among other things, determine an end of speech. The assistant 1 voice service 160a may determine the end of speech based on a certain amount of time elapsed following recognizable speech in the audio data, based on a prediction made by a trained model (e.g., such as an ASR model), and/or based on an indication that the button 113 has been released (e.g., at the stage 250). Upon determining an end of speech, the assistant 1 voice service 160a may send (254) a stop capture command to the multi-assistant middleware 140. The multi-assistant middleware 140 may, in response to the stop capture command, update (256) a state of the system 100 from a "listening" state to a "processing" or "thinking" state. In some implementations, the multi-assistant middleware 140 may, in response to the stop capture command, send a command to the AFE 121 to cease capturing audio and/or generating audio data.

The assistant 1 voice service 160a may generate a response (e.g., "3 pm") to the utterance and send (258) the response to the multi-assistant middleware 140. The multi-assistant middleware 140 may update (260) the system state to "responding" or "speaking," and send (262) the response data to the client software 130. The client software 130 may cause (264) the device 110 to output the response from the speaker 112 in the form of synthesized speech representing an answer, confirmation, and/or other response to the utterance.

FIG. 3 is a signal flow diagram illustrating first example operations of default agent fallback in a multi-assistant system 100 processing an utterance that does not include a wakeword, according to embodiments of the present disclosure. In the example operations illustrated in FIG. 3, the system 100 starts a timer upon detection of voice activity following a button press, but does not detect a wakeword prior to time out. The system 100 thus sends the audio data for processing consistent with the default virtual assistant via the assistant 2 voice service 160b (e.g., via the assistant 2 interface 145 and the assistant 2 component 150b, not pictured).

The operations may begin with a detection (302) of a press of the button 113. In response to the button press, the microphone 114 may turn on (304) and begin capturing audio. The microphone 114 may remain on and capturing audio (306) until the button 113 is released. When the microphone 114 is activated, the AFE 121 may receive (308) an analog audio signal from the microphone and convert it to audio data, which it may in turn send (310) in parallel to the wakeword detector 122, the VAD 124, and/or the buffer 134. In this example, the AFE 121 has received an audio signal representing the command "Play My Show."

The VAD 124 may receive the audio data and may begin detecting voice activity in the audio and send (312) a VAD signal indicating that it has begun detecting speech. The client software 130 may receive the VAD signal and start (314) a timer. The timer may have been preconfigured for a threshold duration equal to a longest speaking duration of wakewords enabled for the device 110/system 100 plus a margin duration. The timer may continue to run (316) for the threshold duration.

The wakeword detector 122 may receive the audio data and process it to determine whether the audio data includes a representation of any of the enabled wakewords. In the example shown in FIG. 3, the wakeword detector 122 does not detect any wakewords prior to the timer timing out (324). In response to determining that no wakeword was detected prior to the timer timing out, the client software 130 may determine (326) that the utterance is to be processed using an assistant voice service 160 corresponding to a default virtual assistant for the system 100, in this case the assistant 2 voice service 160b.

The client software 130 may thus send (328) a dialog request to the multi-assistant middleware 140. In this example, the multi-assistant middleware 140 may grant (330) the request, and update the system 100 state to a "listening" state (332). Upon granting the request, the multi-assistant middleware 140 may send (334) an indication representing a dialog handle back to the client software 130. The dialog handle may include data such as a dialog identifier, a virtual assistant identifier, etc., that the client software 130 may use to request speech processing of the audio data using the assistant 2 voice service 160b. The client software 130 may cause (338) the buffer 134 to send (340) the audio data stored therein to the multi-assistant middleware 140, which may send (342) the audio data to the assistant 2 voice service 160b. The assistant 2 voice service 160b may (e.g., using the language processing components described with reference to FIGS. 5 and 6) process (344) the audio data; for example, using ASR, NLU, one or more skills, and/or TTS to perform an action indicated by the utterance including generating a response.

Following the speech, the VAD 124 may determine (318) that it is no longer detecting voice activity. The system 100 may detect (320) the button release and deactivate (322) audio capture.

The assistant 2 voice service 160b may continue processing (344) the audio data to, among other things, determine an end of speech. The assistant 2 voice service 160b may determine the end of speech. Upon determining an end of speech, the assistant 2 voice service 160b may send (354) a stop capture command to the multi-assistant middleware 140. The multi-assistant middleware 140 may, in response to the stop capture command, update (356) a state of the system 100 from a "listening" state to a "processing" or "thinking" state.

The assistant 2 voice service 160b may generate a response (e.g., "Playing My Show.") to the utterance and send (358) the response to the multi-assistant middleware 140. The multi-assistant middleware 140 may update (360) the system state to "responding" or "speaking," and send (362) the response data to the client software 130. The client software 130 may cause (364) the device 110 to output the response from the speaker 112 in the form of synthesized speech representing an answer, confirmation, and/or other response to the utterance.

FIG. 4 is a signal flow diagram illustrating second example operations of default agent fallback in a multi-assistant system 100 processing an utterance that does not include a wakeword, according to embodiments of the present disclosure. In the example operations illustrated in FIG. 4, the system 100 starts a timer upon detection of voice activity following a button press, but detects a gap in the VAD signal inconsistent with wakewords enabled for the device 110/system 100. The system 100 thus sends the audio data for processing consistent with the default virtual assistant via the assistant 2 voice service 160b (e.g., via the assistant 2 interface 145 and the assistant 2 component 150b, not pictured).

The operations may begin with a detection (402) of a press of the button 113. In response to the button press, the microphone 114 may turn on (404) and begin capturing audio. The microphone 114 may remain on and capturing audio (406) until the button 113 is released. When the microphone 114 is activated, the AFE 121 may receive (408) an analog audio signal from the microphone and convert it to audio data, which it may in turn send (410) in parallel to the wakeword detector 122, the VAD 124, and/or the buffer 134. In this example, the AFE 121 has received an audio signal representing a beginning of the command "Play."

The VAD 124 may receive the audio data and may begin detecting voice activity in the audio and send (412) a VAD signal indicating that it has begun detecting speech. The client software 130 may receive the VAD signal and start (414) a timer. The timer may have been preconfigured for a threshold duration equal to a longest speaking duration of wakewords enabled for the device 110/system 100 plus a margin duration. The timer may continue to run (416) for the threshold duration.

The wakeword detector 122 may receive the audio data and process it to determine whether the audio data includes a representation of any of the enabled wakewords. In the example shown in FIG. 4, the wakeword detector 122 does not detect any wakewords prior to the timer timing out (424). However, even before the timeout, the VAD 124 may indicate a gap in voice activity inconsistent with wakewords enabled for the device. For example, the microphone 114 may further receive audio representing "Trivia" and send (420) the audio signal to the AFE 121. The AFE 121 may send (422) audio data representing "Trivia" to the wakeword detector 122, the VAD 124, and/or the buffer 134. The VAD 124 may determine a gap in voice activity between "Play" and "Trivia." After indicating detected voice activity at the stage 412, the VAD 124 may indicate no voice activity at a stage 418. Subsequently, the VAD 124 may indicate voice activity at a stage 424, and then no voice activity at a stage 425. The system 100 may determine that the gap indicated by the VAD signal between the stages 418 and 424 is inconsistent with the VAD signatures of enabled wakewords. As a result, the client software 130 may determine (426) that the utterance is to be processed using an assistant voice service 160 corresponding to a default virtual assistant for the system 100, in this case the assistant 2 voice service 160*b*.

The client software 130 may thus send (428) a dialog request to the multi-assistant middleware 140. In this example, the multi-assistant middleware 140 may grant (430) the request, and update the system 100 state to a "listening" state (432). Upon granting the request, the multi-assistant middleware 140 may send (434) an indication representing a dialog handle back to the client software 130. The dialog handle may include data such as a dialog identifier, a virtual assistant identifier, etc., that the client software 130 may use to request speech processing of the audio data using the assistant 2 voice service 160*b*. The client software 130 may cause (438) the buffer 134 to send (440) the audio data stored therein to the multi-assistant middleware 140, which may send (442) the audio data to the assistant 2 voice service 160*b*. The assistant 2 voice service 160*b* may (e.g., using the language processing components described with reference to FIGS. 5 and 6) process (444) the audio data; for example, using ASR, NLU, one or more skills, and/or TTS to perform an action indicated by the utterance including generating a response.

Following the speech, the system 100 may detect (446) the button release and deactivate (448) audio capture.

The assistant 2 voice service 160*b* may continue processing (444) the audio data to, among other things, determine an end of speech. The assistant 2 voice service 160*b* may determine the end of speech. Upon determining an end of speech, the assistant 2 voice service 160*b* may send (454) a stop capture command to the multi-assistant middleware 140. The multi-assistant middleware 140 may, in response to the stop capture command, update (456) a state of the system 100 from a "listening" state to a "processing" or "thinking" state.

The assistant 2 voice service 160*b* may generate a response (e.g., "Welcome to Trivia.") to the utterance and send (458) the response to the multi-assistant middleware 140. The multi-assistant middleware 140 may update (460) the system state to "responding" or "speaking," and send (462) the response data to the client software 130. The client software 130 may cause (464) the device 110 to output the response from the speaker 112 in the form of synthesized speech representing an answer, confirmation, and/or other response to the utterance.

FIG. 5 is a conceptual diagram illustrating components that may be included in a first example implementation of the multi-assistant system 100, according to embodiments of the present disclosure. In the implementation of the system 100 shown in FIG. 5, components corresponding to a first virtual assistant (e.g., the assistant 1 voice service 160*a*) may be divided and/or shared between the device 110 and a first system 120*a*, components corresponding to a second virtual assistant may be divided and/or shared between the device 110 and a second system 120*b*, etc. The respective systems 120 may be separate and distinct from each other. Data from the device 110 corresponding to a first virtual assistant (e.g., an utterance to be handled by the first virtual assistant) may be sent to the first system 120*a*, and data from the device corresponding to a second virtual assistant may be sent to the second system 120*b*, etc.

The system 100 may operate using various components as described in FIG. 5. The various components may be located on same or different physical devices. Communication between various components may occur directly or across a network(s) 199. The device 110 may include audio capture component(s), such as a microphone or array of microphones of a device 110, captures audio 11 and creates corresponding audio data. Once speech is detected in audio data representing the audio 11, the device 110 may determine if the speech is directed at the device 110/system 120. In at least some embodiments, such determination may be made using a wakeword detection component 122. The wakeword detection component 122 may be configured to detect various wakewords. In at least some examples, each wakeword may correspond to a name of a different digital assistant. An example wakeword/digital assistant name is "Alexa." In another example, input to the system may be in form of text data, for example as a result of a user typing an input into a user interface of device 110. Other input forms may include indication that the user has pressed a physical or virtual button on device 110, the user has made a gesture, etc.

Following detection of a wakeword, button press, or other indication to begin receiving input, the device 110 may "wake" and begin generating and processing audio data 111 representing the audio 11. The audio data 111 may include data corresponding to the wakeword; in other embodiments, the portion of the audio corresponding to the wakeword may be removed prior to downstream processing of the audio data 111 (e.g., ASR and/or NLU). In the case of touch input detection or gesture based input detection, the audio data may not include a wakeword.

Upon receipt by the system 100, the audio data 111 may be sent to an orchestrator component 530. The orchestrator component 530 may include memory and logic that enables the orchestrator component 530 to transmit various pieces and forms of data to various components of the system, as well as perform other operations as described herein.

The orchestrator component 530 may send the audio data 111 to a language processing components 592. The language processing components 592 (sometimes also referred to as a spoken language understanding (SLU) component) includes an automatic speech recognition (ASR) component 550 and a natural language understanding (NLU) component 560. The ASR component 550 may transcribe the audio data 111 into text data. The ASR component 550 may receive the audio data 111 in a streaming fashion; that is, the ASR component 550 may begin receiving and/or processing the audio data 111 as it is generated by the system 100 and without necessarily waiting for the user to stop speaking, release the button 113, or otherwise indicate an end of speech. The text data output by the ASR component 550 represents one or more than one (e.g., in the form of an N-best list) ASR hypotheses representing speech represented in the audio data 111. The ASR component 550 interprets the speech in the audio data 111 based on a similarity between the audio data 111 and pre-established language models. For example, the ASR component 550 may compare the audio data 111 with models for sounds (e.g., acoustic units such as phonemes, senons, phones, etc.) and sequences of sounds to identify words that match the sequence of sounds of the speech represented in the audio data 111. The ASR component 550 sends the text data generated thereby to an NLU component 560, via, in some embodiments, the orchestrator component 530. The text data sent from the ASR component 550 to the NLU component 560 may include a single top-scoring ASR hypothesis or may include an N-best list including multiple top-scoring ASR hypotheses. An N-best list may additionally include a respective score associated with each ASR hypothesis represented therein. The ASR component 550 is described in greater detail below with regard to FIG. 7.

The language processing components 592 may further include a NLU component 560. The NLU component 560 may receive the text data from the ASR component. The NLU component 560 may attempts to make a semantic interpretation of the phrase(s) or statement(s) represented in the text data input therein by determining one or more meanings associated with the phrase(s) or statement(s) represented in the text data. The NLU component 560 may determine an intent representing an action that a user desires be performed and may determine information that allows a device (e.g., the device 110, the system(s) 120, a skill component 590, a skill system(s) 525, etc.) to execute the intent. For example, if the text data corresponds to "play the $5^{th}$ Symphony by Beethoven," the NLU component 560 may determine an intent that the system output music and may identify "Beethoven" as an artist/composer and "5th Symphony" as the piece of music to be played. For further example, if the text data corresponds to "what is the weather," the NLU component 560 may determine an intent that the system output weather information associated with a geographic location of the device 110. In another example, if the text data corresponds to "turn off the lights," the NLU component 560 may determine an intent that the system turn off lights associated with the device 110 or the user 5. However, if the NLU component 560 is unable to resolve the entity—for example, because the entity is referred to by anaphora such as "this song" or "my next appointment"—the language processing components 592 may send a decode request to another speech processing system for information regarding the entity mention and/or other context related to the utterance. The speech processing system 592 may augment, correct, or base results data upon the audio data 111 as well as any data received from the other speech processing system.

The NLU component 560 may return NLU results data 985/925 (which may include tagged text data, indicators of intent, etc.) back to the orchestrator component 530. The orchestrator component 530 may forward the NLU results data to a skill component(s) 590. If the NLU results data includes a single NLU hypothesis, the NLU component 560 and the orchestrator component 530 may direct the NLU results data to the skill component(s) 590 associated with the NLU hypothesis. If the NLU results data 985/925 includes an N-best list of NLU hypotheses, the NLU component 560 and the orchestrator component 530 may direct the top scoring NLU hypothesis to a skill component(s) 590 associated with the top scoring NLU hypothesis. The system may also include a post-NLU ranker 565 which may incorporate other information to rank potential interpretations determined by the NLU component 560. The NLU component 560, post-NLU ranker 565 and other components are described in greater detail below with regard to FIGS. 8 and 9.

A skill component may be software running on the system(s) 120 that is akin to a software application. That is, a skill component 590 may enable the system(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system(s) 120 may be configured with more than one skill component 590. For example, a weather service skill component may enable the system(s) 120 to provide weather information, a car service skill component may enable the system(s) 120 to book a trip with respect to a taxi or ride sharing service, a restaurant skill component may enable the system(s) 120 to order a pizza with respect to the restaurant's online ordering system, etc. A skill component 590 may operate in conjunction between the system(s) 120 and other devices, such as the device 110, in order to complete certain functions. Inputs to a skill component 590 may come from speech processing interactions or through other interactions or input sources. A skill component 590 may include hardware, software, firmware, or the like that may be dedicated to a particular skill component 590 or shared among different skill components 590.

A skill support system(s) 525 may communicate with a skill component(s) 590 within the system(s) 120 and/or directly with the orchestrator component 530 or with other components. A skill support system(s) 525 may be configured to perform one or more actions. An ability to perform such action(s) may sometimes be referred to as a "skill." That is, a skill may enable a skill support system(s) 525 to execute specific functionality in order to provide data or perform some other action requested by a user. For example, a weather service skill may enable a skill support system(s) 525 to provide weather information to the system(s) 120, a car service skill may enable a skill support system(s) 525 to book a trip with respect to a taxi or ride sharing service, an order pizza skill may enable a skill support system(s) 525 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system(s) 120 may be configured with a skill component 590 dedicated to interacting with the skill support system(s) 525. Unless expressly stated otherwise, reference to a skill, skill device, or skill component may include a skill component 590 operated by the system(s) 120 and/or skill operated by the skill support system(s) 525. Moreover, the functionality described herein as a skill or skill may be referred to using many different terms, such as an action, bot, app, or the like. The skill 590 and or skill support system(s) 525 may return output data to the orchestrator component 530.

The system 120 includes a language output components 593. The language output components 593 includes a natural language generation (NLG) component 579 and a text-to-speech (TTS) component 580. The NLG component 579 can generate text for purposes of TTS output to a user. For example the NLG component 579 may generate text corresponding to instructions corresponding to a particular action for the user to perform. The NLG component 579 may generate appropriate text for various outputs as described herein. The NLG component 579 may include one or more trained models configured to output text appropriate for a particular input. The text output by the NLG component 579 may become input for the TTS component 580 (e.g., output text data 1010 discussed below). Alternatively or in addition, the TTS component 580 may receive text data from a skill 590 or other system component for output.

The NLG component 579 may include a trained model. The NLG component 579 generates text data 1010 from dialog data received (e.g., by a dialog manager) such that the output text data 1010 has a natural feel and, in some embodiments, includes words and/or phrases specifically formatted for a requesting individual. The NLG may use templates to formulate responses. And/or the NLG system may include models trained from the various templates for forming the output text data 1010. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the text-to-speech component 580.

The TTS component 580 may generate audio data (e.g., synthesized speech) from text data using one or more different methods. Text data input to the TTS component 580 may come from a skill component 590, the orchestrator component 530, or another component of the system. In one method of synthesis called unit selection, the TTS component 580 matches text data against a database of recorded speech. The TTS component 580 selects matching units of recorded speech and concatenates the units together to form audio data. In another method of synthesis called parametric synthesis, the TTS component 580 varies parameters such as frequency, volume, and noise to create audio data including an artificial speech waveform. Parametric synthesis uses a computerized voice generator, sometimes called a vocoder.

The system 100 (either on device 110, system 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 570 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the system 120 with permission to allow the skill to execute with respect to the user's natural language user inputs. If a user does not enable a skill, the system 120 may not invoke the skill to execute with respect to the user's natural language user inputs.

The profile storage 570 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 570 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

FIG. 6 is a conceptual diagram illustrating components that may be included in a second example implementation of the multi-assistant system 100, according to embodiments of the present disclosure. In the implementation of the system 100 shown in FIG. 6, components corresponding to multiple virtual assistant may be divided and/or shared between the device 110 and the system 120. Processing of data by components of the system 120 may be performed according to a determined virtual assistant using configuration data maintained by the multi-assistant component 615. For example, data received by the system 120 for processing may include an assistant identifier or other metadata that the components of the system 120 may use to process the data in a manner consistent with the determined virtual assistant. Thus, the system 120 may perform language processing using models, entity libraries, etc. corresponding to the determined virtual assistant, and may generate synthesized speech using voice parameters corresponding to the determined virtual assistant, etc.

In some implementations, the system 120 may have and/or interface with skill components dedicated to a particular virtual assistant. For example, the device 110 and/or system 120 may include first assistant skills 690, which may include skill components 590 as previously described. The device 110 and/or system 120 may further include second assistant skills 691 including skill components 690a, 690b, and 690c (collectively, "skill components 690"). In some implementations, the skill components 690 may be the same as or similar to the skill components 590. In some implementations, the first assistant skills 690 may provide different functionality than the second assistant skills. In some implementations, the first assistant skills 690 may be general-purpose skills (e.g., shopping, weather, music, etc.) not specific to a particular domain or device, while the second assistant skills 691 may be specialized to a certain domain, device, service, etc., such as for controlling operations of the smart TV 110g. Some of the skill components 590 may interface with one or more skill support systems 525; similarly, some of the skill components 690 may interface with one or more skill support systems 625. In some implementations, the system 100 may have other skills and/or skill components that are common to more than one virtual assistant.

Other components of the system 100 illustrated in FIG. 6, such as the language processing components 592, language output components 593, profile storage 570, and/or orchestrator component 530 may be the same as or similar to the corresponding components as described with respect to FIG. 5.

Figure 7:
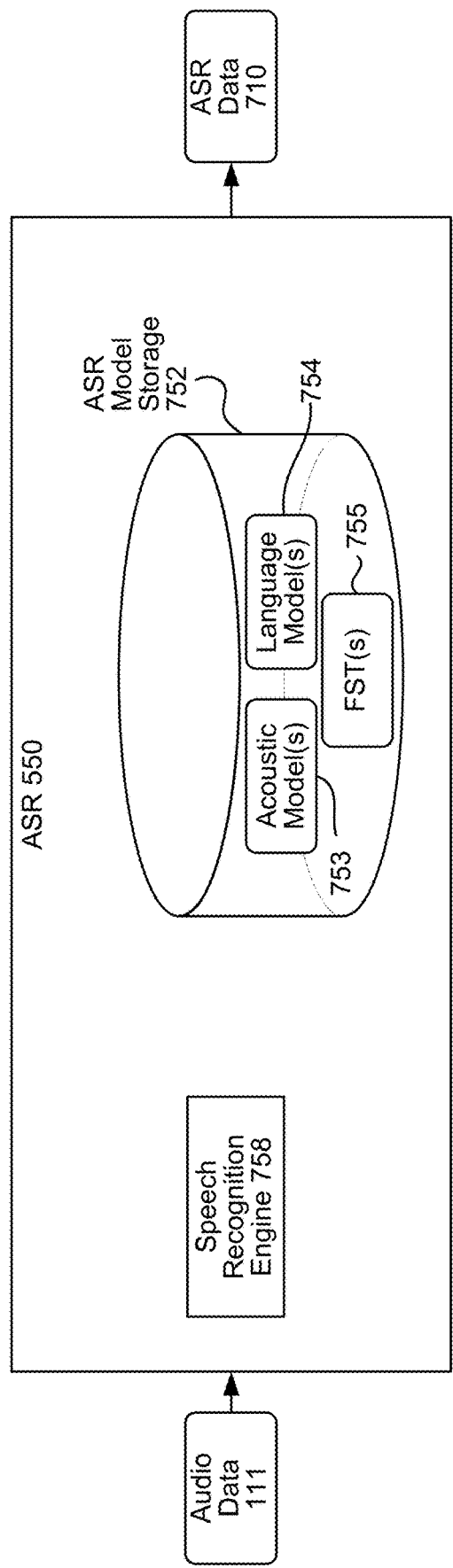
FIG. 7 is a conceptual diagram of an ASR component, according to embodiments of the present disclosure.

FIG. 7 is a conceptual diagram of an ASR component 550, according to embodiments of the present disclosure. The ASR component 550 may interpret a spoken natural language input based on the similarity between the spoken natural language input and pre-established language models 754 stored in an ASR model storage 752. For example, the ASR component 550 may compare the audio data with models for sounds (e.g., subword units or phonemes) and sequences of sounds to identify words that match the sequence of sounds spoken in the natural language input. Alternatively, the ASR component 550 may use a finite state transducer (FST) 755 to implement the language model functions.

When the ASR component 550 generates more than one ASR hypothesis for a single spoken natural language input, each ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, the similarity of the sound in the spoken natural language input to models for language sounds (e.g., an acoustic model 753 stored in the ASR model storage 752), and the likelihood that a particular word, which matches the sounds, would be included in the sentence at the specific location (e.g., using a language or grammar model 754). Based on the considered factors and the assigned confidence score, the ASR component 550 may output an ASR hypothesis that most likely matches the spoken natural language input, or may output multiple ASR hypotheses in the form of a lattice or an N-best list, with each ASR hypothesis corresponding to a respective score.

The ASR component 550 may include a speech recognition engine 758. The ASR component 550 receives audio data 111 (for example, received from a local device 110 having processed audio detected by a microphone by an acoustic front end (AFE) or other component). The speech recognition engine 758 compares the audio data 111 with acoustic models 753, language models 754, FST(s) 755, and/or other data models and information for recognizing the speech conveyed in the audio data. The audio data 111 may be audio data that has been digitized (for example by an AFE) into frames representing time intervals for which the AFE determines a number of values, called features, representing the qualities of the audio data, along with a set of those values, called a feature vector, representing the features/qualities of the audio data within the frame. In at least some embodiments, audio frames may be 10 ms each. Many different features may be determined, as known in the art, and each feature may represent some quality of the audio that may be useful for ASR processing. A number of approaches may be used by an AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 758 may process the audio data 111 with reference to information stored in the ASR model storage 752. Feature vectors of the audio data 111 may arrive at the system 120 encoded, in which case they may be decoded prior to processing by the speech recognition engine 758.

The speech recognition engine 758 attempts to match received feature vectors to language acoustic units (e.g., phonemes) and words as known in the stored acoustic models 753, language models 5B54, and FST(s) 755. For example, audio data 111 may be processed by one or more acoustic model(s) 753 to determine acoustic unit data. The acoustic unit data may include indicators of acoustic units detected in the audio data 111 by the ASR component 550. For example, acoustic units can consist of one or more of phonemes, diaphonemes, tonemes, phones, diphones, triphones, or the like. The acoustic unit data can be represented using one or a series of symbols from a phonetic alphabet such as the X-SAMPA, the International Phonetic Alphabet, or Initial Teaching Alphabet (ITA) phonetic alphabets. In some implementations a phoneme representation of the audio data can be analyzed using an n-gram based tokenizer. An entity, or a slot representing one or more entities, can be represented by a series of n-grams.

The acoustic unit data may be processed using the language model 754 (and/or using FST 755) to determine ASR output data 710. The ASR output data 710 can include one or more hypotheses. One or more of the hypotheses represented in the ASR output data 710 may then be sent to further components (such as the NLU component 560) for further processing as discussed herein. The ASR output data 710 may include representations of text of an utterance, such as words, subword units, or the like.

The speech recognition engine 758 computes scores for the feature vectors based on acoustic information and language information. The acoustic information (such as identifiers for acoustic units and/or corresponding scores) is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR component 550 will output ASR hypotheses that make sense grammatically. The specific models used may be general models or may be models corresponding to a particular domain, such as music, banking, etc.

The speech recognition engine 758 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using FSTs, may also be used.

The speech recognition engine 758 may use the acoustic model(s) 753 to attempt to match received audio feature vectors to words or subword acoustic units. An acoustic unit may be a senone, phoneme, phoneme in context, syllable, part of a syllable, syllable in context, or any other such portion of a word. The speech recognition engine 758 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR component 550 outputs ASR hypotheses that make sense grammatically.

The speech recognition engine 758 may use a number of techniques to match feature vectors to phonemes or other acoustic units, such as diphones, triphones, etc. One common technique is using Hidden Markov Models (HMMs). HMMs are used to determine probabilities that feature vectors may match phonemes. Using HMMs, a number of states are presented, in which the states together represent a potential phoneme (or other acoustic unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 758, the state may change or stay the same, based on the processing of the new feature vectors. A Viterbi algorithm may be used to find the most likely sequence of states based on the processed feature vectors.

The probable phonemes and related states/state transitions, for example HMM states, may be formed into paths traversing a lattice of potential phonemes. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 758 may also compute scores of branches of the paths based on language models or grammars. Language modeling involves determining scores for what words are likely to be used together to form coherent words and sentences. Application of a language model may improve the likelihood that the ASR component 550 correctly interprets the speech contained in the audio data. For example, for an input audio sounding like "hello," acoustic model processing that returns the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

Figure 8:
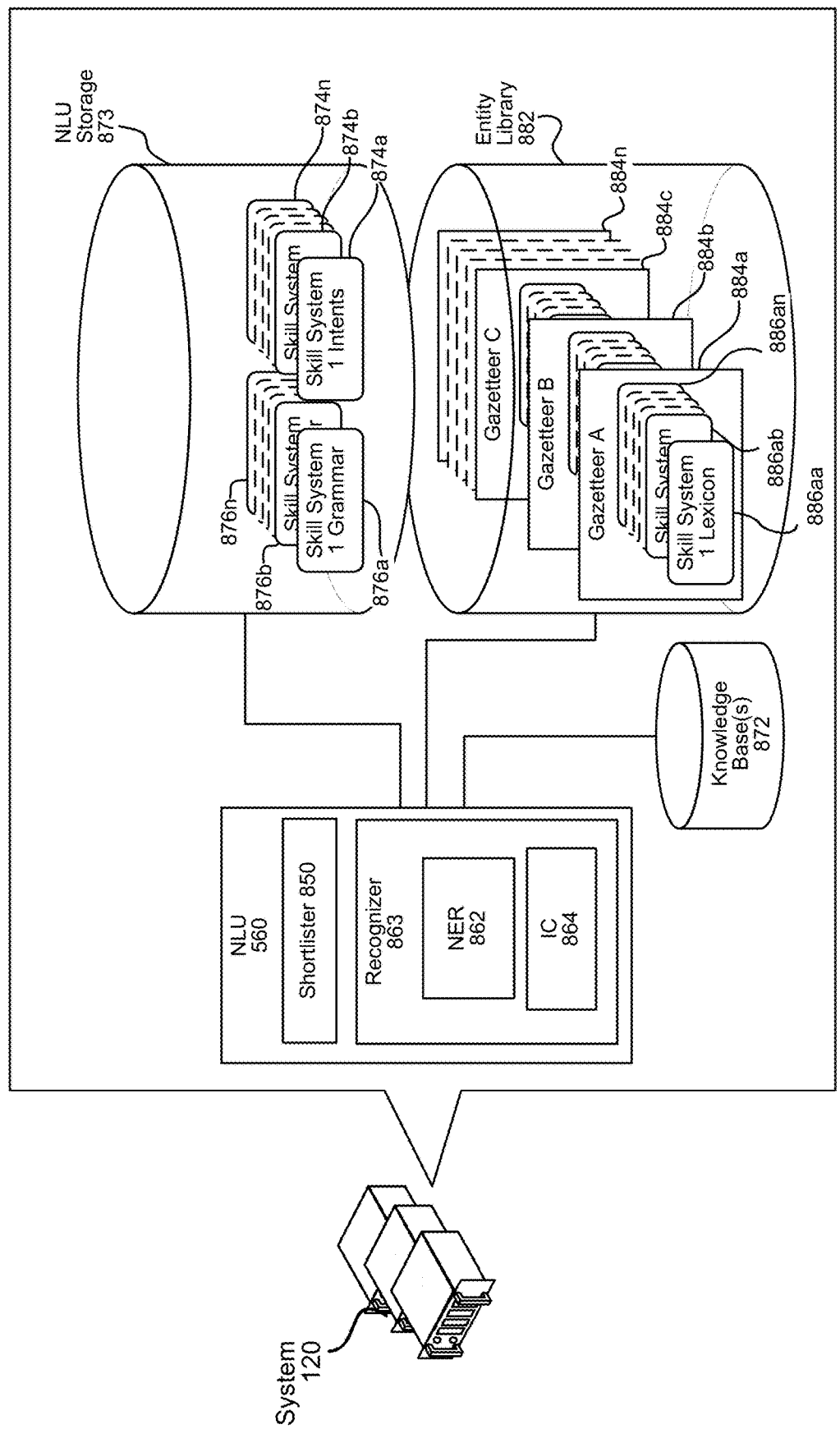
FIG. 8 is a conceptual diagram of how natural language processing is performed, according to embodiments of the present disclosure.
Figure 9:
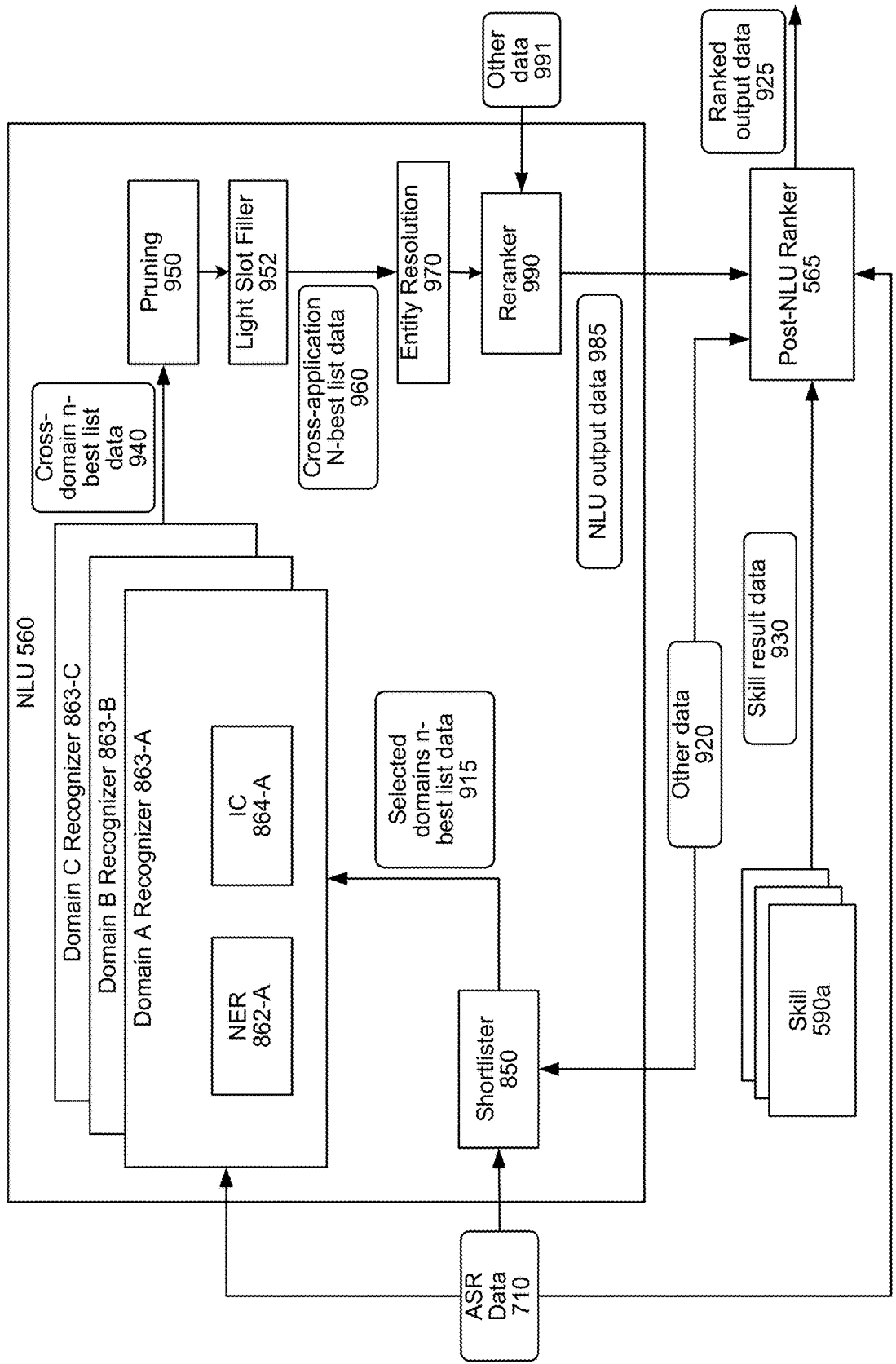
FIG. 9 is a conceptual diagram of how natural language processing is performed, according to embodiments of the present disclosure.

FIGS. 8 and 9 illustrates how the NLU component 560 may perform NLU processing. FIG. 8 is a conceptual diagram of how natural language processing is performed, according to embodiments of the present disclosure. And FIG. 9 is a conceptual diagram of how natural language processing is performed, according to embodiments of the present disclosure.

FIG. 8 illustrates how NLU processing is performed on text data. The NLU component 560 may process text data including several ASR hypotheses of a single user input. For example, if the ASR component 550 outputs text data including an n-best list of ASR hypotheses, the NLU component 560 may process the text data with respect to all (or a portion of) the ASR hypotheses represented therein.

The NLU component 560 may annotate text data by parsing and/or tagging the text data. For example, for the text data "tell me the weather for Seattle," the NLU component 560 may tag "tell me the weather for Seattle" as an <OutputWeather> intent as well as separately tag "Seattle" as a location for the weather information.

The NLU component 560 may include a shortlister component 850. The shortlister component 850 selects skills that may execute with respect to ASR output data 710 input to the NLU component 560 (e.g., applications that may execute with respect to the user input). The ASR output data 710 (which may also be referred to as ASR output data 710) may include representations of text of an utterance, such as words, subword units, or the like. The shortlister component 850 thus limits downstream, more resource intensive NLU processes to being performed with respect to skills that may execute with respect to the user input.

Without a shortlister component 850, the NLU component 560 may process ASR output data 710 input thereto with respect to every skill of the system, either in parallel, in series, or using some combination thereof. By implementing a shortlister component 850, the NLU component 560 may process ASR output data 710 with respect to only the skills that may execute with respect to the user input. This reduces total compute power and latency attributed to NLU processing.

The shortlister component 850 may include one or more trained models. The model(s) may be trained to recognize various forms of user inputs that may be received by the system(s) 120. For example, during a training period skill system(s) 525 associated with a skill may provide the system(s) 120 with training text data representing sample user inputs that may be provided by a user to invoke the skill. For example, for a ride sharing skill, a skill system(s) 525 associated with the ride sharing skill may provide the system(s) 120 with training text data including text corresponding to "get me a cab to [location]," "get me a ride to [location]," "book me a cab to [location]," "book me a ride to [location]," etc. The one or more trained models that will be used by the shortlister component 850 may be trained, using the training text data representing sample user inputs, to determine other potentially related user input structures that users may try to use to invoke the particular skill. During training, the system(s) 120 may solicit the skill system(s) 525 associated with the skill regarding whether the determined other user input structures are permissible, from the perspective of the skill system(s) 525, to be used to invoke the skill. The alternate user input structures may be derived by one or more trained models during model training and/or may be based on user input structures provided by different skills. The skill system(s) 525 associated with a particular skill may also provide the system(s) 120 with training text data indicating grammar and annotations. The system(s) 120 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 850 may be trained with respect to a different skill. Alternatively, the shortlister component 850 may use one trained model per domain, such as one trained model for skills associated with a weather domain, one trained model for skills associated with a ride sharing domain, etc.

The system(s) 120 may use the sample user inputs provided by a skill system(s) 525, and related sample user inputs potentially determined during training, as binary examples to train a model associated with a skill associated with the skill system(s) 525. The model associated with the particular skill may then be operated at runtime by the shortlister component 850. For example, some sample user inputs may be positive examples (e.g., user inputs that may be used to invoke the skill). Other sample user inputs may be negative examples (e.g., user inputs that may not be used to invoke the skill).

As described above, the shortlister component 850 may include a different trained model for each skill of the system, a different trained model for each domain, or some other combination of trained model(s). For example, the shortlister component 850 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 850 to output indications of only a portion of the skills that the ASR output data 710 may relate to. For example, a user input may correspond to "tell me about Tom Collins." If the model is clustered based on domain, the shortlister component 850 may determine the user input corresponds to a recipe skill (e.g., a drink recipe) even though the user input may also correspond to an information skill (e.g., including information about a person named Tom Collins).

The NLU component 560 may include one or more recognizers 863. In at least some embodiments, a recognizer 863 may be associated with a skill system 525 (e.g., the recognizer may be configured to interpret text data to correspond to the skill system 525). In at least some other examples, a recognizer 863 may be associated with a domain such as smart home, video, music, weather, custom, etc. (e.g., the recognizer may be configured to interpret text data to correspond to the domain).

If the shortlister component 850 determines ASR output data 710 is potentially associated with multiple domains, the recognizers 863 associated with the domains may process the ASR output data 710, while recognizers 863 not indicated in the shortlister component 850's output may not process the ASR output data 710. The "shortlisted" recognizers 863 may process the ASR output data 710 in parallel, in series, partially in parallel, etc. For example, if ASR output data 710 potentially relates to both a communications domain and a music domain, a recognizer associated with the communications domain may process the ASR output data 710 in parallel, or partially in parallel, with a recognizer associated with the music domain processing the ASR output data 710.

Each recognizer 863 may include a named entity recognition (NER) component 862. The NER component 862 attempts to identify grammars and lexical information that may be used to construe meaning with respect to text data input therein. The NER component 862 identifies portions of text data that correspond to a named entity associated with a domain, associated with the recognizer 863 implementing the NER component 862. The NER component 862 (or other component of the NLU component 560) may also determine whether a word refers to an entity whose identity is not explicitly mentioned in the text data, for example "him," "her," "it" or other anaphora, exophora, or the like.

Each recognizer 863, and more specifically each NER component 862, may be associated with a particular grammar database 876, a particular set of intents/actions 874, and a particular personalized lexicon 886. The grammar databases 876, and intents/actions 874 may be stored in an NLU storage 873. Each gazetteer 884 may include domain/skill-indexed lexical information associated with a particular user and/or device 110. For example, a Gazetteer A (884*a*) includes skill-indexed lexical information 886*aa* to 886*an*. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 862 applies grammar information 876 and lexical information 886 associated with a domain (associated with the recognizer 863 implementing the NER component 862) to determine a mention of one or more entities in text data. In this manner, the NER component 862 identifies "slots" (each corresponding to one or more particular words in text data) that may be useful for later processing. The NER component 862 may also label each slot with a type (e.g., noun, place, city, artist name, song name, etc.).

Each grammar database 876 includes the names of entities (i.e., nouns) commonly found in speech about the particular domain to which the grammar database 876 relates, whereas the lexical information 886 is personalized to the user and/or the device 110 from which the user input originated. For example, a grammar database 876 associated with a shopping domain may include a database of words commonly used when people discuss shopping.

A downstream process called entity resolution (discussed in detail elsewhere herein) links a slot of text data to a specific entity known to the system. To perform entity resolution, the NLU component 560 may utilize gazetteer information (884*a*-884*n*) stored in an entity library storage 882. The gazetteer information 884 may be used to match text data (representing a portion of the user input) with text data representing known entities, such as song titles, contact names, etc. Gazetteers 884 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 863 may also include an intent classification (IC) component 864. An IC component 864 parses text data to determine an intent(s) (associated with the domain associated with the recognizer 863 implementing the IC component 864) that potentially represents the user input. An intent represents to an action a user desires be performed. An IC component 864 may communicate with a database 874 of words linked to intents. For example, a music intent database may link words and phrases such as "quiet," "volume off," and "mute" to a <Mute> intent. An IC component 864 identifies potential intents by comparing words and phrases in text data (representing at least a portion of the user input) to the words and phrases in an intents database 874 (associated with the domain that is associated with the recognizer 863 implementing the IC component 864).

The intents identifiable by a specific IC component 864 are linked to domain-specific (i.e., the domain associated with the recognizer 863 implementing the IC component 864) grammar frameworks 876 with "slots" to be filled.

Each slot of a grammar framework 876 corresponds to a portion of text data that the system believes corresponds to an entity. For example, a grammar framework 876 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 876 may not be structured as sentences, but rather based on associating slots with grammatical tags.

For example, an NER component 862 may parse text data to identify words as subject, object, verb, preposition, etc. based on grammar rules and/or models prior to recognizing named entities in the text data. An IC component 864 (implemented by the same recognizer 863 as the NER component 862) may use the identified verb to identify an intent. The NER component 862 may then determine a grammar model 876 associated with the identified intent. For example, a grammar model 876 for an intent corresponding to <PlayMusic> may specify a list of slots applicable to play the identified "object" and any object modifier (e.g., a prepositional phrase), such as {Artist Name}, {Album Name}, {Song name}, etc. The NER component 862 may then search corresponding fields in a lexicon 886 (associated with the domain associated with the recognizer 863 implementing the NER component 862), attempting to match words and phrases in text data the NER component 862 previously tagged as a grammatical object or object modifier with those identified in the lexicon 886.

An NER component 862 may perform semantic tagging, which is the labeling of a word or combination of words according to their type/semantic meaning. An NER component 862 may parse text data using heuristic grammar rules, or a model may be constructed using techniques such as Hidden Markov Models, maximum entropy models, log linear models, conditional random fields (CRF), and the like. For example, an NER component 862 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 862 identifies "Play" as a verb based on a word database associated with the music domain, which an IC component 864 (also implemented by the music domain recognizer) may determine corresponds to a <PlayMusic> intent. At this stage, no determination has been made as to the meaning of "mother's little helper" or "the rolling stones," but based on grammar rules and models, the NER component 862 has determined the text of these phrases relates to the grammatical object (i.e., entity) of the user input represented in the text data.

An NER component 862 may tag text data to attribute meaning thereto. For example, an NER component 862 may tag "play mother's little helper by the rolling stones" as: {domain} Music, {intent}<PlayMusic>, {artist name} rolling stones, {media type} SONG, and {song title} mother's little helper. For further example, the NER component 862 may tag "play songs by the rolling stones" as: {domain} Music, {intent}<PlayMusic>, {artist name} rolling stones, and {media type} SONG.

The shortlister component 850 may receive ASR output data 710 output from the ASR component 550 or output from the device 110*b* (as illustrated in FIG. 9). The ASR component 550 may embed the ASR output data 710 into a form processable by a trained model(s) using sentence embedding techniques as known in the art. Sentence embedding results in the ASR output data 710 including text in a structure that enables the trained models of the shortlister component 850 to operate on the ASR output data 710. For example, an embedding of the ASR output data 710 may be a vector representation of the ASR output data 710.

The shortlister component 850 may make binary determinations (e.g., yes or no) regarding which domains relate to the ASR output data 710. The shortlister component 850 may make such determinations using the one or more trained models described herein above. If the shortlister component 850 implements a single trained model for each domain, the shortlister component 850 may simply run the models that are associated with enabled domains as indicated in a user profile associated with the device 110 and/or user that originated the user input.

The shortlister component 850 may generate n-best list data 915 representing domains that may execute with respect to the user input represented in the ASR output data 710. The size of the n-best list represented in the n-best list data 915 is configurable. In an example, the n-best list data 915 may indicate every domain of the system as well as contain an indication, for each domain, regarding whether the domain is likely capable to execute the user input represented in the ASR output data 710. In another example, instead of indicating every domain of the system, the n-best list data 915 may only indicate the domains that are likely to be able to execute the user input represented in the ASR output data 710. In yet another example, the shortlister component 850 may implement thresholding such that the n-best list data 915 may indicate no more than a maximum number of domains that may execute the user input represented in the ASR output data 710. In an example, the threshold number of domains that may be represented in the n-best list data 915 is ten. In another example, the domains included in the n-best list data 915 may be limited by a threshold a score, where only domains indicating a likelihood to handle the user input is above a certain score (as determined by processing the ASR output data 710 by the shortlister component 850 relative to such domains) are included in the n-best list data 915.

The ASR output data 710 may correspond to more than one ASR hypothesis. When this occurs, the shortlister component 850 may output a different n-best list (represented in the n-best list data 915) for each ASR hypothesis. Alternatively, the shortlister component 850 may output a single n-best list representing the domains that are related to the multiple ASR hypotheses represented in the ASR output data 710.

As indicated above, the shortlister component 850 may implement thresholding such that an n-best list output therefrom may include no more than a threshold number of entries. If the ASR output data 710 includes more than one ASR hypothesis, the n-best list output by the shortlister component 850 may include no more than a threshold number of entries irrespective of the number of ASR hypotheses output by the ASR component 550. Alternatively or in addition, the n-best list output by the shortlister component 850 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the ASR output data 710, the shortlister component 850 may generate confidence scores representing likelihoods that domains relate to the ASR output data 710. If the shortlister component 850 implements a different trained model for each domain, the shortlister component 850 may generate a different confidence score for each individual domain trained model that is run. If the shortlister component 850 runs the models of every domain when ASR output data 710 is received, the shortlister component 850 may generate a different confidence score for each domain of the system. If the shortlister component 850 runs the models of only the domains that are associated with skills indicated as enabled in a user profile associated with the device 110 and/or user that originated the user input, the shortlister component 850 may only generate a different confidence score for each domain associated with at least one enabled skill. If the shortlister component 850 implements a single trained model with domain specifically trained portions, the shortlister component 850 may generate a different confidence score for each domain who's specifically trained portion is run. The shortlister component 850 may perform matrix vector modification to obtain confidence scores for all domains of the system in a single instance of processing of the ASR output data 710.

N-best list data 915 including confidence scores that may be output by the shortlister component 850 may be represented as, for example:

Search domain, 0.67
Recipe domain, 0.62
Information domain, 0.57
Shopping domain, 0.42

As indicated, the confidence scores output by the shortlister component 850 may be numeric values. The confidence scores output by the shortlister component 850 may alternatively be binned values (e.g., high, medium, low).

The n-best list may only include entries for domains having a confidence score satisfying (e.g., equaling or exceeding) a minimum threshold confidence score. Alternatively, the shortlister component 850 may include entries for all domains associated with user enabled skills, even if one or more of the domains are associated with confidence scores that do not satisfy the minimum threshold confidence score.

The shortlister component 850 may consider other data 920 when determining which domains may relate to the user input represented in the ASR output data 710 as well as respective confidence scores. The other data 920 may include usage history data associated with the device 110 and/or user that originated the user input. For example, a confidence score of a domain may be increased if user inputs originated by the device 110 and/or user routinely invoke the domain. Conversely, a confidence score of a domain may be decreased if user inputs originated by the device 110 and/or user rarely invoke the domain. Thus, the other data 920 may include an indicator of the user associated with the ASR output data 710.

The other data 920 may be character embedded prior to being input to the shortlister component 850. The other data 920 may alternatively be embedded using other techniques known in the art prior to being input to the shortlister component 850.

The other data 920 may also include data indicating the domains associated with skills that are enabled with respect to the device 110 and/or user that originated the user input. The shortlister component 850 may use such data to determine which domain-specific trained models to run. That is, the shortlister component 850 may determine to only run the trained models associated with domains that are associated with user-enabled skills. The shortlister component 850 may alternatively use such data to alter confidence scores of domains.

As an example, considering two domains, a first domain associated with at least one enabled skill and a second domain not associated with any user-enabled skills of the user that originated the user input, the shortlister component 850 may run a first model specific to the first domain as well as a second model specific to the second domain. Alternatively, the shortlister component 850 may run a model configured to determine a score for each of the first and second domains. The shortlister component 850 may determine a same confidence score for each of the first and second domains in the first instance. The shortlister component 850 may then alter those confidence scores based on which domains is associated with at least one skill enabled by the present user. For example, the shortlister component 850 may increase the confidence score associated with the domain associated with at least one enabled skill while leaving the confidence score associated with the other domain the same. Alternatively, the shortlister component 850 may leave the confidence score associated with the domain associated with at least one enabled skill the same while decreasing the confidence score associated with the other domain. Moreover, the shortlister component 850 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage 570. When the shortlister component 850 receives the ASR output data 710, the shortlister component 850 may determine whether profile data associated with the user and/or device 110 that originated the command includes an indication of enabled skills.

The other data 920 may also include data indicating the type of the device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 850 may use such data to determine which domain-specific trained models to run. For example, if the device 110 corresponds to a displayless type device, the shortlister component 850 may determine not to run trained models specific to domains that output video data. The shortlister component 850 may alternatively use such data to alter confidence scores of domains.

As an example, considering two domains, one that outputs audio data and another that outputs video data, the shortlister component 850 may run a first model specific to the domain that generates audio data as well as a second model specific to the domain that generates video data. Alternatively the shortlister component 850 may run a model configured to determine a score for each domain. The shortlister component 850 may determine a same confidence score for each of the domains in the first instance. The shortlister component 850 may then alter the original confidence scores based on the type of the device 110 that originated the user input corresponding to the ASR output data 710. For example, if the device 110 is a displayless device, the shortlister component 850 may increase the confidence score associated with the domain that generates audio data while leaving the confidence score associated with the domain that generates video data the same. Alternatively, if the device 110 is a displayless device, the shortlister component 850 may leave the confidence score associated with the domain that generates audio data the same while decreasing the confidence score associated with the domain that generates video data.

Moreover, if the device 110 is a displayless device, the shortlister component 850 may increase the confidence score associated with the domain that generates audio data as well as decrease the confidence score associated with the domain that generates video data.

The type of device information represented in the other data 920 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 920 may represent the smart TV of other display device, and not the displayless device that captured the spoken user input.

The other data 920 may also include data indicating the user input originating device's speed, location, or other mobility information. For example, the device may correspond to a vehicle including a display. If the vehicle is moving, the shortlister component 850 may decrease the confidence score associated with a domain that generates video data as it may be undesirable to output video content to a user while the user is driving. The device may output data to the system(s) 120 indicating when the device is moving.

The other data 920 may also include data indicating a currently invoked domain. For example, a user may speak a first (e.g., a previous) user input causing the system to invoke a music domain skill to output music to the user. As the system is outputting music to the user, the system may receive a second (e.g., the current) user input. The shortlister component 850 may use such data to alter confidence scores of domains. For example, the shortlister component 850 may run a first model specific to a first domain as well as a second model specific to a second domain. Alternatively, the shortlister component 850 may run a model configured to determine a score for each domain. The shortlister component 850 may also determine a same confidence score for each of the domains in the first instance. The shortlister component 850 may then alter the original confidence scores based on the first domain being invoked to cause the system to output content while the current user input was received. Based on the first domain being invoked, the shortlister component 850 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 915 generated by the shortlister component 850 as well as the different types of other data 920 considered by the shortlister component 850 are configurable. For example, the shortlister component 850 may update confidence scores as more other data 920 is considered. For further example, the n-best list data 915 may exclude relevant domains if thresholding is implemented. Thus, for example, the shortlister component 850 may include an indication of a domain in the n-best list 915 unless the shortlister component 850 is one hundred percent confident that the domain may not execute the user input represented in the ASR output data 710 (e.g., the shortlister component 850 determines a confidence score of zero for the domain).

The shortlister component 850 may send the ASR output data 710 to recognizers 863 associated with domains represented in the n-best list data 915. Alternatively, the shortlister component 850 may send the n-best list data 915 or some other indicator of the selected subset of domains to another component (such as the orchestrator component 530) which may in turn send the ASR output data 710 to the recognizers 863 corresponding to the domains included in the n-best list data 915 or otherwise indicated in the indicator. If the shortlister component 850 generates an n-best list representing domains without any associated confidence scores, the shortlister component 850/orchestrator component 530 may send the ASR output data 710 to recognizers 863 associated with domains that the shortlister component 850 determines may execute the user input. If the shortlister component 850 generates an n-best list representing domains with associated confidence scores, the shortlister component 850/orchestrator component 530 may send the ASR output data 710 to recognizers 863 associated with domains associated with confidence scores satisfying (e.g., meeting or exceeding) a threshold minimum confidence score.

A recognizer 863 may output tagged text data generated by an NER component 862 and an IC component 864, as described herein above. The NLU component 560 may compile the output tagged text data of the recognizers 863 into a single cross-domain n-best list 940 and may send the cross-domain n-best list 940 to a pruning component 950. Each entry of tagged text (e.g., each NLU hypothesis) represented in the cross-domain n-best list data 940 may be associated with a respective score indicating a likelihood that the NLU hypothesis corresponds to the domain associated with the recognizer 863 from which the NLU hypothesis was output. For example, the cross-domain n-best list data 940 may be represented as (with each line corresponding to a different NLU hypothesis):

[0.95] Intent: <PlayMusic> ArtistName: Beethoven SongName: Waldstein Sonata
[0.70] Intent: <Play Video> ArtistName: Beethoven VideoName: Waldstein Sonata
[0.01] Intent: <PlayMusic> ArtistName: Beethoven AlbumName: Waldstein Sonata
[0.01] Intent: <PlayMusic> SongName: Waldstein Sonata The pruning component 950 may sort the NLU hypotheses represented in the cross-domain n-best list data 940 according to their respective scores. The pruning component 950 may perform score thresholding with respect to the cross-domain NLU hypotheses. For example, the pruning component 950 may select NLU hypotheses associated with scores satisfying (e.g., meeting and/or exceeding) a threshold score. The pruning component 950 may also or alternatively perform number of NLU hypothesis thresholding. For example, the pruning component 950 may select the top scoring NLU hypothesis(es). The pruning component 950 may output a portion of the NLU hypotheses input thereto. The purpose of the pruning component 950 is to create a reduced list of NLU hypotheses so that downstream, more resource intensive, processes may only operate on the NLU hypotheses that most likely represent the user's intent.

The NLU component 560 may include a light slot filler component 952. The light slot filler component 952 can take text from slots represented in the NLU hypotheses output by the pruning component 950 and alter them to make the text more easily processed by downstream components. The light slot filler component 952 may perform low latency operations that do not involve heavy operations such as reference to a knowledge base (e.g., 872. The purpose of the light slot filler component 952 is to replace words with other words or values that may be more easily understood by downstream components. For example, if a NLU hypothesis includes the word "tomorrow," the light slot filler component 952 may replace the word "tomorrow" with an actual date for purposes of downstream processing. Similarly, the light slot filler component 952 may replace the word "CD" with "album" or the words "compact disc." The replaced words are then included in the cross-domain n-best list data 960.

The cross-domain n-best list data 960 may be input to an entity resolution component 970. The entity resolution component 970 can apply rules or other instructions to standardize labels or tokens from previous stages into an intent/slot representation. The precise transformation may depend on the domain. For example, for a travel domain, the entity resolution component 970 may transform text corresponding to "Boston airport" to the standard BOS three-letter code referring to the airport. The entity resolution component 970 can refer to a knowledge base (e.g., 872) that is used to specifically identify the precise entity referred to in each slot of each NLU hypothesis represented in the cross-domain n-best list data 960. Specific intent/slot combinations may also be tied to a particular source, which may then be used to resolve the text. In the example "play songs by the stones," the entity resolution component 970 may reference a personal music catalog, Amazon Music account, a user profile, or the like. The entity resolution component 970 may output an altered n-best list that is based on the cross-domain n-best list 960 but that includes more detailed information (e.g., entity IDs) about the specific entities mentioned in the slots and/or more detailed slot data that can eventually be used by a skill. The NLU component 560 may include multiple entity resolution components 970 and each entity resolution component 970 may be specific to one or more domains.

The NLU component 560 may include a reranker 990. The reranker 990 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 970.

The reranker 990 may apply re-scoring, biasing, or other techniques. The reranker 990 may consider not only the data output by the entity resolution component 970, but may also consider other data 991. The other data 991 may include a variety of information. For example, the other data 991 may include skill rating or popularity data. For example, if one skill has a high rating, the reranker 990 may increase the score of a NLU hypothesis that may be processed by the skill. The other data 991 may also include information about skills that have been enabled by the user that originated the user input. For example, the reranker 990 may assign higher scores to NLU hypothesis that may be processed by enabled skills than NLU hypothesis that may be processed by non-enabled skills. The other data 991 may also include data indicating user usage history, such as if the user that originated the user input regularly uses a particular skill or does so at particular times of day. The other data 991 may additionally include data indicating date, time, location, weather, type of device 110, user identifier, context, as well as other information. For example, the reranker 990 may consider when any particular skill is currently active (e.g., music being played, a game being played, etc.).

As illustrated and described, the entity resolution component 970 is implemented prior to the reranker 990. The entity resolution component 970 may alternatively be implemented after the reranker 990. Implementing the entity resolution component 970 after the reranker 990 limits the NLU hypotheses processed by the entity resolution component 970 to only those hypotheses that successfully pass through the reranker 990.

The reranker 990 may be a global reranker (e.g., one that is not specific to any particular domain). Alternatively, the NLU component 560 may implement one or more domain-specific rerankers. Each domain-specific reranker may rerank NLU hypotheses associated with the domain. Each domain-specific reranker may output an n-best list of reranked hypotheses (e.g., 5-10 hypotheses).

The NLU component 560 may perform NLU processing described above with respect to domains associated with skills wholly implemented as part of the system(s) 120 (e.g., designated 590 in FIG. 5). The NLU component 560 may separately perform NLU processing described above with respect to domains associated with skills that are at least partially implemented as part of the skill system(s) 525. In an example, the shortlister component 850 may only process with respect to these latter domains. Results of these two NLU processing paths may be merged into NLU output data 985, which may be sent to a post-NLU ranker 565, which may be implemented by the system(s) 120.

The post-NLU ranker 565 may include a statistical component that produces a ranked list of intent/skill pairs with associated confidence scores. Each confidence score may indicate an adequacy of the skill's execution of the intent with respect to NLU results data associated with the skill. The post-NLU ranker 565 may operate one or more trained models configured to process the NLU results data 985, skill result data 930, and the other data 920 in order to output ranked output data 925. The ranked output data 925 may include an n-best list where the NLU hypotheses in the NLU results data 985 are reordered such that the n-best list in the ranked output data 925 represents a prioritized list of skills to respond to a user input as determined by the post-NLU ranker 565. The ranked output data 925 may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 565 enables the system to better determine the best skill to execute the user input. For example, first and second NLU hypotheses in the NLU results data 985 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 565 (or other scheduling component such as orchestrator component 530) may solicit the first skill and the second skill to provide potential result data 930 based on the first NLU hypothesis and the second NLU hypothesis, respectively. For example, the post-NLU ranker 565 may send the first NLU hypothesis to the first skill 590a along with a request for the first skill 590a to at least partially execute with respect to the first NLU hypothesis. The post-NLU ranker 565 may also send the second NLU hypothesis to the second skill 590b along with a request for the second skill 590b to at least partially execute with respect to the second NLU hypothesis. The post-NLU ranker 565 receives, from the first skill 590a, first result data 930a generated from the first skill 590a's execution with respect to the first NLU hypothesis. The post-NLU ranker 565 also receives, from the second skill 590b, second results data 930b generated from the second skill 590b's execution with respect to the second NLU hypothesis.

The result data 930 may include various portions. For example, the result data 930 may include content (e.g., audio data, text data, and/or video data) to be output to a user. The result data 930 may also include a unique identifier used by the system(s) 120 and/or the skill system(s) 525 to locate the data to be output to a user. The result data 930 may also include an instruction. For example, if the user input corresponds to "turn on the light," the result data 930 may include an instruction causing the system to turn on a light associated with a profile of the device (110a/110b) and/or user.

The post-NLU ranker 565 may consider the first result data 930a and the second result data 930b to alter the first confidence score and the second confidence score of the first NLU hypothesis and the second NLU hypothesis, respectively. That is, the post-NLU ranker 565 may generate a third confidence score based on the first result data 930a and the first confidence score. The third confidence score may correspond to how likely the post-NLU ranker 565 determines the first skill will correctly respond to the user input. The post-NLU ranker 565 may also generate a fourth confidence score based on the second result data 930b and the second confidence score. One skilled in the art will appreciate that a first difference between the third confidence score and the fourth confidence score may be greater than a second difference between the first confidence score and the second confidence score. The post-NLU ranker 565 may also consider the other data 920 to generate the third confidence score and the fourth confidence score. While it has been described that the post-NLU ranker 565 may alter the confidence scores associated with first and second NLU hypotheses, one skilled in the art will appreciate that the post-NLU ranker 565 may alter the confidence scores of more than two NLU hypotheses. The post-NLU ranker 565 may select the result data 930 associated with the skill 590 with the highest altered confidence score to be the data output in response to the current user input. The post-NLU ranker 565 may also consider the ASR output data 710 to alter the NLU hypotheses confidence scores.

The orchestrator component 530 may, prior to sending the NLU results data 985 to the post-NLU ranker 565, associate intents in the NLU hypotheses with skills 590. For example, if a NLU hypothesis includes a <PlayMusic> intent, the orchestrator component 530 may associate the NLU hypothesis with one or more skills 590 that can execute the <PlayMusic> intent. Thus, the orchestrator component 530 may send the NLU results data 985, including NLU hypotheses paired with skills 590, to the post-NLU ranker 565. In response to ASR output data 710 corresponding to "what should I do for dinner today," the orchestrator component 530 may generates pairs of skills 590 with associated NLU hypotheses corresponding to:

Skill 1/NLU hypothesis including <Help> intent
Skill 2/NLU hypothesis including <Order> intent
Skill 3/NLU hypothesis including <DishType> intent The post-NLU ranker 565 queries each skill 590, paired with a NLU hypothesis in the NLU output data 985, to provide result data 930 based on the NLU hypothesis with which it is associated. That is, with respect to each skill, the post-NLU ranker 565 colloquially asks the each skill "if given this NLU hypothesis, what would you do with it." According to the above example, the post-NLU ranker 565 may send skills 590 the following data:

Skill 1: First NLU hypothesis including <Help> intent indicator
Skill 2: Second NLU hypothesis including <Order> intent indicator
Skill 3: Third NLU hypothesis including <DishType> intent indicator The post-NLU ranker 565 may query each of the skills 590 in parallel or substantially in parallel.

A skill 590 may provide the post-NLU ranker 565 with various data and indications in response to the post-NLU ranker 565 soliciting the skill 590 for result data 930. A skill 590 may simply provide the post-NLU ranker 565 with an indication of whether or not the skill can execute with respect to the NLU hypothesis it received. A skill 590 may also or alternatively provide the post-NLU ranker 565 with output data generated based on the NLU hypothesis it received. In some situations, a skill 590 may need further information in addition to what is represented in the received NLU hypothesis to provide output data responsive to the user input. In these situations, the skill 590 may provide the post-NLU ranker 565 with result data 930 indicating slots of a framework that the skill 590 further needs filled or entities that the skill 590 further needs resolved prior to the skill 590 being able to provided result data 930 responsive to the user input. The skill 590 may also provide the post-NLU ranker 565 with an instruction and/or computer-generated speech indicating how the skill 590 recommends the system solicit further information needed by the skill 590. The skill 590 may further provide the post-NLU ranker 565 with an indication of whether the skill 590 will have all needed information after the user provides additional information a single time, or whether the skill 590 will need the user to provide various kinds of additional information prior to the skill 590 having all needed information. According to the above example, skills 590 may provide the post-NLU ranker 565 with the following:

Skill 1: indication representing the skill can execute with respect to a NLU hypothesis including the <Help> intent indicator
Skill 2: indication representing the skill needs to the system to obtain further information
Skill 3: indication representing the skill can provide numerous results in response to the third NLU hypothesis including the <DishType> intent indicator Result data 930 includes an indication provided by a skill 590 indicating whether or not the skill 590 can execute with respect to a NLU hypothesis; data generated by a skill 590 based on a NLU hypothesis; as well as an indication provided by a skill 590 indicating the skill 590 needs further information in addition to what is represented in the received NLU hypothesis.

The post-NLU ranker 565 uses the result data 930 provided by the skills 590 to alter the NLU processing confidence scores generated by the reranker 990. That is, the post-NLU ranker 565 uses the result data 930 provided by the queried skills 590 to create larger differences between the NLU processing confidence scores generated by the reranker 990. Without the post-NLU ranker 565, the system may not be confident enough to determine an output in response to a user input, for example when the NLU hypotheses associated with multiple skills are too close for the system to confidently determine a single skill 590 to invoke to respond to the user input. For example, if the system does not implement the post-NLU ranker 565, the system may not be able to determine whether to obtain output data from a general reference information skill or a medical information skill in response to a user input corresponding to "what is acne."

The post-NLU ranker 565 may prefer skills 590 that provide result data 930 responsive to NLU hypotheses over skills 590 that provide result data 930 corresponding to an indication that further information is needed, as well as skills 590 that provide result data 930 indicating they can provide multiple responses to received NLU hypotheses. For example, the post-NLU ranker 565 may generate a first score for a first skill 590a that is greater than the first skill's NLU confidence score based on the first skill 590a providing result data 930a including a response to a NLU hypothesis. For further example, the post-NLU ranker 565 may generate a second score for a second skill 590b that is less than the second skill's NLU confidence score based on the second skill 590b providing result data 930b indicating further information is needed for the second skill 590b to provide a response to a NLU hypothesis. Yet further, for example, the post-NLU ranker 565 may generate a third score for a third skill 590c that is less than the third skill's NLU confidence score based on the third skill 590c providing result data 930c indicating the third skill 590c can provide multiple responses to a NLU hypothesis.

The post-NLU ranker 565 may consider other data 920 in determining scores. The other data 920 may include rankings associated with the queried skills 590. A ranking may be a system ranking or a user-specific ranking. A ranking may indicate a veracity of a skill from the perspective of one or more users of the system. For example, the post-NLU ranker 565 may generate a first score for a first skill 590a that is greater than the first skill's NLU processing confidence score based on the first skill 590a being associated with a high ranking. For further example, the post-NLU ranker 565 may generate a second score for a second skill 590b that is less than the second skill's NLU processing confidence score based on the second skill 590b being associated with a low ranking.

The other data 920 may include information indicating whether or not the user that originated the user input has enabled one or more of the queried skills 590. For example, the post-NLU ranker 565 may generate a first score for a first skill 590a that is greater than the first skill's NLU processing confidence score based on the first skill 590a being enabled by the user that originated the user input. For further example, the post-NLU ranker 565 may generate a second score for a second skill 590b that is less than the second skill's NLU processing confidence score based on the second skill 590b not being enabled by the user that originated the user input. When the post-NLU ranker 565 receives the NLU results data 985, the post-NLU ranker 565 may determine whether profile data, associated with the user and/or device that originated the user input, includes indications of enabled skills.

The other data 920 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 565 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 565 may increase the NLU processing confidence score associated with a first skill configured to output visual data and/or decrease the NLU processing confidence score associated with a second skill configured to output audio data.

The other data 920 may include information indicating the veracity of the result data 930 provided by a skill 590. For example, if a user says "tell me a recipe for pasta sauce," a first skill 590a may provide the post-NLU ranker 565 with first result data 930a corresponding to a first recipe associated with a five star rating and a second skill 590b may provide the post-NLU ranker 565 with second result data 930b corresponding to a second recipe associated with a one star rating. In this situation, the post-NLU ranker 565 may increase the NLU processing confidence score associated with the first skill 590a based on the first skill 590a providing the first result data 930a associated with the five star rating and/or decrease the NLU processing confidence score associated with the second skill 590b based on the second skill 590b providing the second result data 930b associated with the one star rating.

The other data 920 may include information indicating the type of device that originated the user input. For example, the device may correspond to a "hotel room" type if the device is located in a hotel room. If a user inputs a command corresponding to "order me food" to the device located in the hotel room, the post-NLU ranker 565 may increase the NLU processing confidence score associated with a first skill 590a corresponding to a room service skill associated with the hotel and/or decrease the NLU processing confidence score associated with a second skill 590b corresponding to a food skill not associated with the hotel.

The other data 920 may include information indicating a location of the device and/or user that originated the user input. The system may be configured with skills 590 that may only operate with respect to certain geographic locations. For example, a user may provide a user input corresponding to "when is the next train to Portland." A first skill 590a may operate with respect to trains that arrive at, depart from, and pass through Portland, Oregon. A second skill 590b may operate with respect to trains that arrive at, depart from, and pass through Portland, Maine. If the device and/or user that originated the user input is located in Seattle, Washington, the post-NLU ranker 565 may increase the NLU processing confidence score associated with the first skill 590a and/or decrease the NLU processing confidence score associated with the second skill 590b. Likewise, if the device and/or user that originated the user input is located in Boston, Massachusetts, the post-NLU ranker 565 may increase the NLU processing confidence score associated with the second skill 590b and/or decrease the NLU processing confidence score associated with the first skill 590a.

The other data 920 may include information indicating a time of day. The system may be configured with skills 590 that operate with respect to certain times of day. For example, a user may provide a user input corresponding to "order me food." A first skill 590a may generate first result data 930a corresponding to breakfast. A second skill 590b may generate second result data 930b corresponding to dinner. If the system(s) 120 receives the user input in the morning, the post-NLU ranker 565 may increase the NLU processing confidence score associated with the first skill 590a and/or decrease the NLU processing score associated with the second skill 590b. If the system(s) 120 receives the user input in the afternoon or evening, the post-NLU ranker 565 may increase the NLU processing confidence score associated with the second skill 590b and/or decrease the NLU processing confidence score associated with the first skill 590a.

The other data 920 may include information indicating user preferences. The system may include multiple skills 590 configured to execute in substantially the same manner. For example, a first skill 590a and a second skill 590b may both be configured to order food from respective restaurants. The system may store a user preference (e.g., in the profile storage 570) that is associated with the user that provided the user input to the system(s) 120 as well as indicates the user prefers the first skill 590a over the second skill 590b. Thus, when the user provides a user input that may be executed by both the first skill 590a and the second skill 590b, the post-NLU ranker 565 may increase the NLU processing confidence score associated with the first skill 590a and/or decrease the NLU processing confidence score associated with the second skill 590b.

The other data 920 may include information indicating system usage history associated with the user that originated the user input. For example, the system usage history may indicate the user originates user inputs that invoke a first skill 590a more often than the user originates user inputs that invoke a second skill 590b. Based on this, if the present user input may be executed by both the first skill 590a and the second skill 590b, the post-NLU ranker 565 may increase the NLU processing confidence score associated with the first skill 590a and/or decrease the NLU processing confidence score associated with the second skill 590b.

The other data 920 may include information indicating a speed at which the device 110 that originated the user input is traveling. For example, the device 110 may be located in a moving vehicle, or may be a moving vehicle. When a device 110 is in motion, the system may prefer audio outputs rather than visual outputs to decrease the likelihood of distracting the user (e.g., a driver of a vehicle). Thus, for example, if the device 110 that originated the user input is moving at or above a threshold speed (e.g., a speed above an average user's walking speed), the post-NLU ranker 565 may increase the NLU processing confidence score associated with a first skill 590a that generates audio data. The post-NLU ranker 565 may also or alternatively decrease the NLU processing confidence score associated with a second skill 590b that generates image data or video data.

The other data 920 may include information indicating how long it took a skill 590 to provide result data 930 to the post-NLU ranker 565. When the post-NLU ranker 565 multiple skills 590 for result data 930, the skills 590 may respond to the queries at different speeds. The post-NLU ranker 565 may implement a latency budget. For example, if the post-NLU ranker 565 determines a skill 590 responds to the post-NLU ranker 565 within a threshold amount of time from receiving a query from the post-NLU ranker 565, the post-NLU ranker 565 may increase the NLU processing confidence score associated with the skill 590. Conversely, if the post-NLU ranker 565 determines a skill 590 does not respond to the post-NLU ranker 565 within a threshold amount of time from receiving a query from the post-NLU ranker 565, the post-NLU ranker 565 may decrease the NLU processing confidence score associated with the skill 590.

It has been described that the post-NLU ranker 565 uses the other data 920 to increase and decrease NLU processing confidence scores associated with various skills 590 that the post-NLU ranker 565 has already requested result data from. Alternatively, the post-NLU ranker 565 may use the other data 920 to determine which skills 590 to request result data from. For example, the post-NLU ranker 565 may use the other data 920 to increase and/or decrease NLU processing confidence scores associated with skills 590 associated with the NLU results data 985 output by the NLU component 560. The post-NLU ranker 565 may select n-number of top scoring altered NLU processing confidence scores. The post-NLU ranker 565 may then request result data 930 from only the skills 590 associated with the selected n-number of NLU processing confidence scores.

As described, the post-NLU ranker 565 may request result data 930 from all skills 590 associated with the NLU results data 985 output by the NLU component 560. Alternatively, the system(s) 120 may prefer result data 930 from skills implemented entirely by the system(s) 120 rather than skills at least partially implemented by the skill system(s) 525. Therefore, in the first instance, the post-NLU ranker 565 may request result data 930 from only skills associated with the NLU results data 985 and entirely implemented by the system(s) 120. The post-NLU ranker 565 may only request result data 930 from skills associated with the NLU results data 985, and at least partially implemented by the skill system(s) 525, if none of the skills, wholly implemented by the system(s) 120, provide the post-NLU ranker 565 with result data 930 indicating either data response to the NLU results data 985, an indication that the skill can execute the user input, or an indication that further information is needed.

As indicated above, the post-NLU ranker 565 may request result data 930 from multiple skills 590. If one of the skills 590 provides result data 930 indicating a response to a NLU hypothesis and the other skills provide result data 930 indicating either they cannot execute or they need further information, the post-NLU ranker 565 may select the result data 930 including the response to the NLU hypothesis as the data to be output to the user. If more than one of the skills 590 provides result data 930 indicating responses to NLU hypotheses, the post-NLU ranker 565 may consider the other data 920 to generate altered NLU processing confidence scores, and select the result data 930 of the skill associated with the greatest score as the data to be output to the user.

A system that does not implement the post-NLU ranker 565 may select the highest scored NLU hypothesis in the NLU results data 985. The system may send the NLU hypothesis to a skill 590 associated therewith along with a request for output data. In some situations, the skill 590 may not be able to provide the system with output data. This results in the system indicating to the user that the user input could not be processed even though another skill associated with lower ranked NLU hypothesis could have provided output data responsive to the user input.

The post-NLU ranker 565 reduces instances of the aforementioned situation. As described, the post-NLU ranker 565 queries multiple skills associated with the NLU results data 985 to provide result data 930 to the post-NLU ranker 565 prior to the post-NLU ranker 565 ultimately determining the skill 590 to be invoked to respond to the user input. Some of the skills 590 may provide result data 930 indicating responses to NLU hypotheses while other skills 590 may providing result data 930 indicating the skills cannot provide responsive data. Whereas a system not implementing the post-NLU ranker 565 may select one of the skills 590 that could not provide a response, the post-NLU ranker 565 only selects a skill 590 that provides the post-NLU ranker 565 with result data corresponding to a response, indicating further information is needed, or indicating multiple responses can be generated.

The post-NLU ranker 565 may select result data 930, associated with the skill 590 associated with the highest score, for output to the user. Alternatively, the post-NLU ranker 565 may output ranked output data 925 indicating skills 590 and their respective post-NLU ranker rankings. Since the post-NLU ranker 565 receives result data 930, potentially corresponding to a response to the user input, from the skills 590 prior to post-NLU ranker 565 selecting one of the skills or outputting the ranked output data 925, little to no latency occurs from the time skills provide result data 930 and the time the system outputs responds to the user.

If the post-NLU ranker 565 selects result audio data to be output to a user and the system determines content should be output audibly, the post-NLU ranker 565 (or another component of the system(s) 120) may cause the device 110*a* and/or the device 110*b* to output audio corresponding to the result audio data. If the post-NLU ranker 565 selects result text data to output to a user and the system determines content should be output visually, the post-NLU ranker 565 (or another component of the system(s) 120) may cause the device 110*b* to display text corresponding to the result text data. If the post-NLU ranker 565 selects result audio data to output to a user and the system determines content should be output visually, the post-NLU ranker 565 (or another component of the system(s) 120) may send the result audio data to the ASR component 550. The ASR component 550 may generate output text data corresponding to the result audio data. The system(s) 120 may then cause the device 110*b* to display text corresponding to the output text data. If the post-NLU ranker 565 selects result text data to output to a user and the system determines content should be output audibly, the post-NLU ranker 565 (or another component of the system(s) 120) may send the result text data to the TTS component 580. The TTS component 580 may generate output audio data (corresponding to computer-generated speech) based on the result text data. The system(s) 120 may then cause the device 110*a* and/or the device 110*b* to output audio corresponding to the output audio data.

As described, a skill 590 may provide result data 930 either indicating a response to the user input, indicating more information is needed for the skill 590 to provide a response to the user input, or indicating the skill 590 cannot provide a response to the user input. If the skill 590 associated with the highest post-NLU ranker score provides the post-NLU ranker 565 with result data 930 indicating a response to the user input, the post-NLU ranker 565 (or another component of the system(s) 120, such as the orchestrator component 530) may simply cause content corresponding to the result data 930 to be output to the user. For example, the post-NLU ranker 565 may send the result data 930 to the orchestrator component 530. The orchestrator component 530 may cause the result data 930 to be sent to the device (110a/110b), which may output audio and/or display text corresponding to the result data 930. The orchestrator component 530 may send the result data 930 to the ASR component 550 to generate output text data and/or may send the result data 930 to the TTS component 580 to generate output audio data, depending on the situation.

The skill 590 associated with the highest post-NLU ranker score may provide the post-NLU ranker 565 with result data 930 indicating more information is needed as well as instruction data. The instruction data may indicate how the skill 590 recommends the system obtain the needed information. For example, the instruction data may correspond to text data or audio data (i.e., computer-generated speech) corresponding to "please indicate _____." The instruction data may be in a format (e.g., text data or audio data) capable of being output by the device (110a/110b). When this occurs, the post-NLU ranker 565 may simply cause the received instruction data be output by the device (110a/110b). Alternatively, the instruction data may be in a format that is not capable of being output by the device (110a/110b). When this occurs, the post-NLU ranker 565 may cause the ASR component 550 or the TTS component 580 to process the instruction data, depending on the situation, to generate instruction data that may be output by the device (110a/110b). Once the user provides the system with all further information needed by the skill 590, the skill 590 may provide the system with result data 930 indicating a response to the user input, which may be output by the system as detailed above.

The system may include "informational" skills 590 that simply provide the system with information, which the system outputs to the user. The system may also include "transactional" skills 590 that require a system instruction to execute the user input. Transactional skills 590 include ride sharing skills, flight booking skills, etc. A transactional skill 590 may simply provide the post-NLU ranker 565 with result data 930 indicating the transactional skill 590 can execute the user input. The post-NLU ranker 565 may then cause the system to solicit the user for an indication that the system is permitted to cause the transactional skill 590 to execute the user input. The user-provided indication may be an audible indication or a tactile indication (e.g., activation of a virtual button or input of text via a virtual keyboard). In response to receiving the user-provided indication, the system may provide the transactional skill 590 with data corresponding to the indication. In response, the transactional skill 590 may execute the command (e.g., book a flight, book a train ticket, etc.). Thus, while the system may not further engage an informational skill 590 after the informational skill 590 provides the post-NLU ranker 565 with result data 930, the system may further engage a transactional skill 590 after the transactional skill 590 provides the post-NLU ranker 565 with result data 930 indicating the transactional skill 590 may execute the user input.

In some instances, the post-NLU ranker 565 may generate respective scores for first and second skills that are too close (e.g., are not different by at least a threshold difference) for the post-NLU ranker 565 to make a confident determination regarding which skill should execute the user input. When this occurs, the system may request the user indicate which skill the user prefers to execute the user input. The system may output TTS-generated speech to the user to solicit which skill the user wants to execute the user input.

One or more models implemented by components of the orchestrator component 530, post-NLU ranker 565, short-lister component 850, or other component may be trained and operated according to various machine learning techniques.

Figure 10:
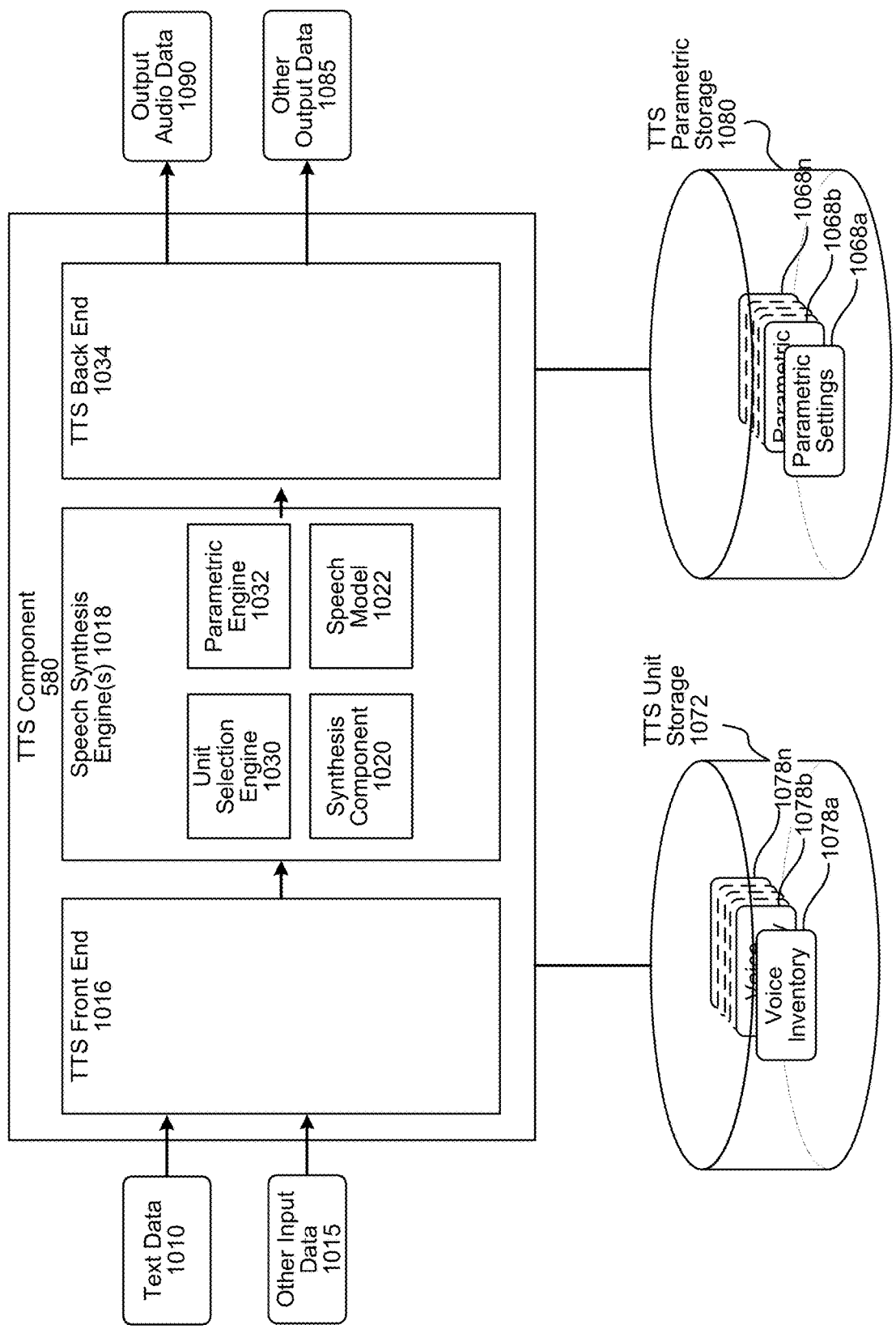
FIG. 10 is a conceptual diagram of text-to-speech components according to embodiments of the present disclosure.

Components of a system that may be used to perform unit selection, parametric TTS processing, and/or model-based audio synthesis are shown in FIG. 10. As shown in FIG. 10, the TTS component/processor 580 may include a TTS front end 1016, a speech synthesis engine 1018, TTS unit storage 1072, TTS parametric storage 1080, and a TTS back end 1034. The TTS unit storage 1072 may include, among other things, voice inventories 1078a-1078n that may include pre-recorded audio segments (called units) to be used by the unit selection engine 1030 when performing unit selection synthesis as described below. The TTS parametric storage 1080 may include, among other things, parametric settings 1068a-1068n that may be used by the parametric synthesis engine 1032 when performing parametric synthesis as described below. A particular set of parametric settings 1068 may correspond to a particular voice profile (e.g., whispered speech, excited speech, etc.).

In various embodiments of the present disclosure, model-based synthesis of audio data may be performed using by a speech model 1022 and a TTS front end 1016. The TTS front end 1016 may be the same as front ends used in traditional unit selection or parametric systems. In other embodiments, some or all of the components of the TTS front end 1016 are based on other trained models. The present disclosure is not, however, limited to any particular type of TTS front end 1016. The speech model 1022 may be used to synthesize speech without requiring the TTS unit storage 1072 or the TTS parametric storage 1080, as described in greater detail below.

TTS component receives text data 1010. Although the text data 1010 in FIG. 10 is input into the TTS component 580, it may be output by other component(s) (such as a skill 590, NLU component 560, NLG component 579 or other component) and may be intended for output by the system. Thus in certain instances text data 1010 may be referred to as "output text data." Further, the data 1010 may not necessarily be text, but may include other data (such as symbols, code, other data, etc.) that may reference text (such as an indicator of a word) that is to be synthesized. Thus data 1010 may come in a variety of forms. The TTS front end 1016 transforms the data 1010 (from, for example, an application, user, device, or other data source) into a symbolic linguistic representation, which may include linguistic context features such as phoneme data, punctuation data, syllable-level features, word-level features, and/or emotion, speaker, accent, or other features for processing by the speech synthesis engine 1018. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the text data 1010, such as surprise, anger, or fear. The speaker features may include data corresponding to a type of speaker, such as sex, age, or profession. The accent features may include data corresponding to an accent associated with the speaker, such as Southern, Boston, English, French, or other such accent.

The TTS front end 1016 may also process other input data 1015, such as text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The tags may be included in the text data 1010 and/or the text for a TTS request may be accompanied by separate metadata indicating what text should be whispered (or have some other indicated audio characteristic). The speech synthesis engine 1018 may compare the annotated phonetic units models and information stored in the TTS unit storage 1072 and/or TTS parametric storage 1080 for converting the input text into speech. The TTS front end 1016 and speech synthesis engine 1018 may include their own controller(s)/processor(s) and memory or they may use the controller/processor and memory of the server 120, device 110, or other device, for example. Similarly, the instructions for operating the TTS front end 1016 and speech synthesis engine 1018 may be located within the TTS component 580, within the memory and/or storage of the server 120, device 110, or within an external device.

Text data 1010 input into the TTS component 580 may be sent to the TTS front end 1016 for processing. The front end 1016 may include components for performing text normalization, linguistic analysis, linguistic prosody generation, or other such components. During text normalization, the TTS front end 1016 may first process the text input and generate standard text, converting such things as numbers, abbreviations (such as Apt., St., etc.), symbols ($, %, etc.) into the equivalent of written out words.

During linguistic analysis, the TTS front end 1016 may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. The TTS component 580 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS unit storage 1072. The linguistic analysis performed by the TTS front end 1016 may also identify different grammatical components such as prefixes, suffixes, phrases, punctuation, syntactic boundaries, or the like. Such grammatical components may be used by the TTS component 580 to craft a natural-sounding audio waveform output. The language dictionary may also include letter-to-sound rules and other tools that may be used to pronounce previously unidentified words or letter combinations that may be encountered by the TTS component 580. Generally, the more information included in the language dictionary, the higher quality the speech output.

Based on the linguistic analysis the TTS front end 1016 may then perform linguistic prosody generation where the phonetic units are annotated with desired prosodic characteristics, also called acoustic features, which indicate how the desired phonetic units are to be pronounced in the eventual output speech. During this stage the TTS front end 1016 may consider and incorporate any prosodic annotations that accompanied the text input to the TTS component 580. Such acoustic features may include syllable-level features, word-level features, emotion, speaker, accent, language, pitch, energy, duration, and the like. Application of acoustic features may be based on prosodic models available to the TTS component 580. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, a prosodic model with more information may result in higher quality speech output than prosodic models with less information. Further, a prosodic model and/or phonetic units may be used to indicate particular speech qualities of the speech to be synthesized, where those speech qualities may match the speech qualities of input speech (for example, the phonetic units may indicate prosodic characteristics to make the ultimately synthesized speech sound like a whisper based on the input speech being whispered).

The output of the TTS front end 1016, which may be referred to as a symbolic linguistic representation, may include a sequence of phonetic units annotated with prosodic characteristics. This symbolic linguistic representation may be sent to the speech synthesis engine 1018, which may also be known as a synthesizer, for conversion into an audio waveform of speech for output to an audio output device and eventually to a user. The speech synthesis engine 1018 may be configured to convert the input text into high-quality natural-sounding speech in an efficient manner. Such high-quality speech may be configured to sound as much like a human speaker as possible, or may be configured to be understandable to a listener without attempts to mimic a precise human voice.

The speech synthesis engine 1018 may perform speech synthesis using one or more different methods. In one method of synthesis called unit selection, described further below, a unit selection engine 1030 matches the symbolic linguistic representation created by the TTS front end 1016 against a database of recorded speech, such as a database (e.g., TTS unit storage 1072) storing information regarding one or more voice corpuses (e.g., voice inventories 1078*a-n*). Each voice inventory may correspond to various segments of audio that was recorded by a speaking human, such as a voice actor, where the segments are stored in an individual inventory 1078 as acoustic units (e.g., phonemes, diphones, etc.). Each stored unit of audio may also be associated with an index listing various acoustic properties or other descriptive information about the unit. Each unit includes an audio waveform corresponding with a phonetic unit, such as a short .wav file of the specific sound, along with a description of various features associated with the audio waveform. For example, an index entry for a particular unit may include information such as a particular unit's pitch, energy, duration, harmonics, center frequency, where the phonetic unit appears in a word, sentence, or phrase, the neighboring phonetic units, or the like. The unit selection engine 1030 may then use the information about each unit to select units to be joined together to form the speech output.

The unit selection engine 1030 matches the symbolic linguistic representation against information about the spoken audio units in the database. The unit database may include multiple examples of phonetic units to provide the system with many different options for concatenating units into speech. Matching units which are determined to have the desired acoustic qualities to create the desired output audio are selected and concatenated together (for example by a synthesis component 1020) to form output audio data 1090 representing synthesized speech. Using all the information in the unit database, a unit selection engine 1030 may match units to the input text to select units that can form a natural sounding waveform. One benefit of unit selection is that, depending on the size of the database, a natural sounding speech output may be generated. As described above, the larger the unit database of the voice corpus, the more likely the system will be able to construct natural sounding speech.

In another method of synthesis—called parametric synthesis—parameters such as frequency, volume, noise, are varied by a parametric synthesis engine 1032, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Using parametric synthesis, a computing system (for example, a synthesis component 1020) can generate audio waveforms having the desired acoustic properties. Parametric synthesis may include the ability to be accurate at high processing speeds, as well as the ability to process speech without large databases associated with unit selection, but also may produce an output speech quality that may not match that of unit selection. Unit selection and parametric techniques may be performed individually or combined together and/or combined with other synthesis techniques to produce speech audio output.

The TTS component 580 may be configured to perform TTS processing in multiple languages. For each language, the TTS component 580 may include specially configured data, instructions and/or components to synthesize speech in the desired language(s). To improve performance, the TTS component 580 may revise/update the contents of the TTS unit storage 1072 based on feedback of the results of TTS processing, thus enabling the TTS component 580 to improve speech synthesis.

The TTS unit storage 1072 may be customized for an individual user based on his/her individualized desired speech output. In particular, the speech unit stored in a unit database may be taken from input audio data of the user speaking. For example, to create the customized speech output of the system, the system may be configured with multiple voice inventories 1078a-1078n, where each unit database is configured with a different "voice" to match desired speech qualities. Such voice inventories may also be linked to user accounts. The voice selected by the TTS component 580 may be used to synthesize the speech. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterances may be spoken by an individual (such as a voice actor) and recorded by the system. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match the respective desired speech quality. The customized voice inventory 1078 may then be used during runtime to perform unit selection to synthesize speech having a speech quality corresponding to the input speech quality.

Additionally, parametric synthesis may be used to synthesize speech with the desired speech quality. For parametric synthesis, parametric features may be configured that match the desired speech quality. If simulated excited speech was desired, parametric features may indicate an increased speech rate and/or pitch for the resulting speech. Many other examples are possible. The desired parametric features for particular speech qualities may be stored in a "voice" profile (e.g., parametric settings 1068) and used for speech synthesis when the specific speech quality is desired. Customized voices may be created based on multiple desired speech qualities combined (for either unit selection or parametric synthesis). For example, one voice may be "shouted" while another voice may be "shouted and emphasized." Many such combinations are possible.

Unit selection speech synthesis may be performed as follows. Unit selection includes a two-step process. First a unit selection engine 1030 determines what speech units to use and then it combines them so that the particular combined units match the desired phonemes and acoustic features and create the desired speech output. Units may be selected based on a cost function which represents how well particular units fit the speech segments to be synthesized. The cost function may represent a combination of different costs representing different TTS aspects of how well a particular speech unit may work for a particular speech segment. For example, a target cost indicates how well an individual given speech unit matches the features of a desired speech output (e.g., pitch, prosody, etc.). A join cost represents how well a particular speech unit matches an adjacent speech unit (e.g., a speech unit appearing directly before or directly after the particular speech unit) for purposes of concatenating the speech units together in the eventual synthesized speech. The overall cost function is a combination of target cost, join cost, and other costs that may be determined by the unit selection engine 1030. As part of unit selection, the unit selection engine 1030 chooses the speech unit with the lowest overall combined cost. For example, a speech unit with a very low target cost may not necessarily be selected if its join cost is high.

The system may be configured with one or more voice corpuses for unit selection. Each voice corpus may include a speech unit database. The speech unit database may be stored in TTS unit storage 1072 or in another storage component. For example, different unit selection databases may be stored in TTS unit storage 1072. Each speech unit database (e.g., voice inventory) includes recorded speech utterances with the utterances' corresponding text aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation the speech synthesis engine 1018 may attempt to select a unit in the speech unit database that most closely matches the input text (including both phonetic units and prosodic annotations). Generally the larger the voice corpus/speech unit database the better the speech synthesis may be achieved by virtue of the greater number of unit samples that may be selected to form the precise desired speech output.

Vocoder-based parametric speech synthesis may be performed as follows. A TTS component 580 may include an acoustic model, or other models, which may convert a symbolic linguistic representation into a synthetic acoustic waveform of the text input based on audio signal manipulation. The acoustic model includes rules which may be used by the parametric synthesis engine 1032 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTS front end 1016.

The parametric synthesis engine 1032 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 1018, the state may change or stay the same, based on the processing of the new text. For example, the pronunciation of a previously processed word might change based on later processed words. A Viterbi algorithm may be used to find the most likely sequence of states based on the processed text. The HMMs may generate speech in parameterized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, WORLD vocoder, HNM (harmonic plus noise) based vocoders, CELP (code-excited linear prediction) vocoders, GlottHMM vocoders, HSM (harmonic/stochastic model) vocoders, or others.

In addition to calculating potential states for one audio waveform as a potential match to a phonetic unit, the parametric synthesis engine 1032 may also calculate potential states for other potential audio outputs (such as various ways of pronouncing a particular phoneme or diphone) as potential acoustic matches for the acoustic unit. In this manner multiple states and state transition probabilities may be calculated.

The probable states and probable state transitions calculated by the parametric synthesis engine 1032 may lead to a number of potential audio output sequences. Based on the acoustic model and other potential models, the potential audio output sequences may be scored according to a confidence level of the parametric synthesis engine 1032. The highest scoring audio output sequence, including a stream of parameters to be synthesized, may be chosen and digital signal processing may be performed by a vocoder or similar component to create an audio output including synthesized speech waveforms corresponding to the parameters of the highest scoring audio output sequence and, if the proper sequence was selected, also corresponding to the input text. The different parametric settings 1068, which may represent acoustic settings matching a particular parametric "voice", may be used by the synthesis component 1020 to ultimately create the output audio data 1090.

When performing unit selection, after a unit is selected by the unit selection engine 1030, the audio data corresponding to the unit may be passed to the synthesis component 1020. The synthesis component 1020 may then process the audio data of the unit to create modified audio data where the modified audio data reflects a desired audio quality. The synthesis component 1020 may store a variety of operations that can convert unit audio data into modified audio data where different operations may be performed based on the desired audio effect (e.g., whispering, shouting, etc.).

As an example, input text may be received along with metadata, such as SSML tags, indicating that a selected portion of the input text should be whispered when output by the TTS module 580. For each unit that corresponds to the selected portion, the synthesis component 1020 may process the audio data for that unit to create a modified unit audio data. The modified unit audio data may then be concatenated to form the output audio data 1090. The modified unit audio data may also be concatenated with non-modified audio data depending on when the desired whispered speech starts and/or ends. While the modified audio data may be sufficient to imbue the output audio data with the desired audio qualities, other factors may also impact the ultimate output of audio such as playback speed, background effects, or the like, that may be outside the control of the TTS module 580. In that case, other output data 1085 may be output along with the output audio data 1090 so that an ultimate playback device (e.g., device 110) receives instructions for playback that can assist in creating the desired output audio. Thus, the other output data 1085 may include instructions or other data indicating playback device settings (such as volume, playback rate, etc.) or other data indicating how output audio data including synthesized speech should be output. For example, for whispered speech, the output audio data 1090 may include other output data 1085 that may include a prosody tag or other indicator that instructs the device 110 to slow down the playback of the output audio data 1090, thus making the ultimate audio sound more like whispered speech, which is typically slower than normal speech. In another example, the other output data 1085 may include a volume tag that instructs the device 110 to output the speech at a volume level less than a current volume setting of the device 110, thus improving the quiet whisper effect.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 11:
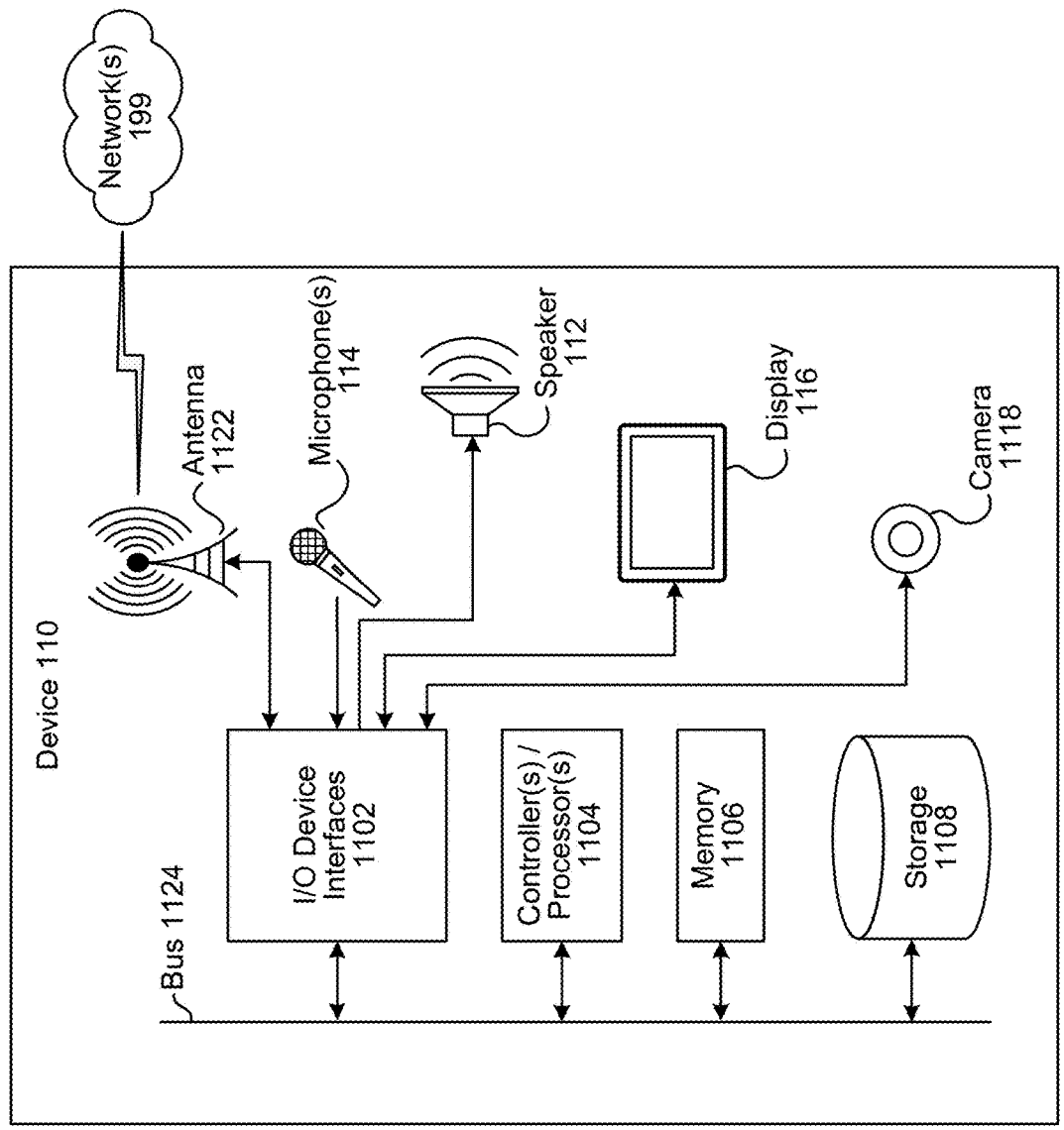
FIG. 11 is a block diagram conceptually illustrating example components of a device, according to embodiments of the present disclosure.
Figure 12:
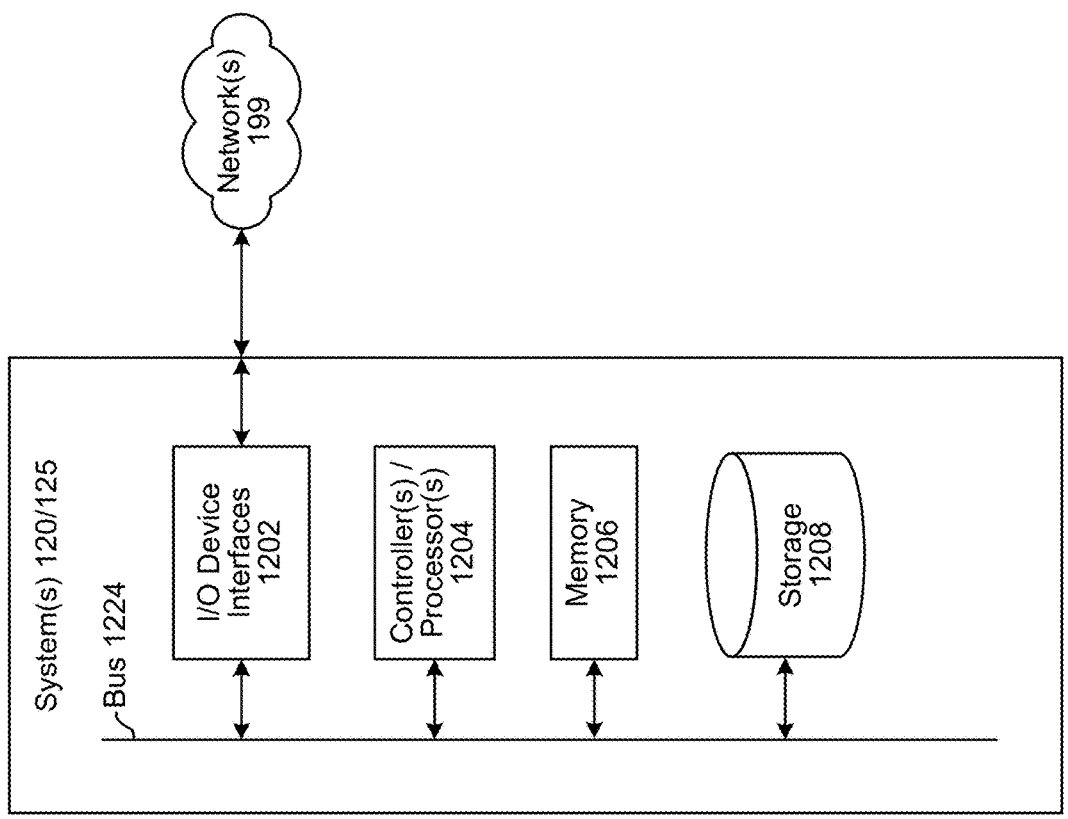
FIG. 12 is a block diagram conceptually illustrating example components of a system, according to embodiments of the present disclosure.

FIG. 11 is a block diagram conceptually illustrating a device 110 that may be used with the system. FIG. 12 is a block diagram conceptually illustrating example components of a remote device, such as the natural language command processing system 120, which may assist with ASR processing, NLU processing, etc., and a skill system 525. A system (120/525) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 110 may operate locally to a user (e.g., within a same environment so the device may receive inputs and playback outputs for the user) he server/system 120 may be located remotely from the device 110 as its operations may not require proximity to the user. The server/system 120 may be located in an entirely different location from the device 110 (for example, as part of a cloud computing system or the like) or may be located in a same environment as the device 110 but physically separated therefrom (for example a home server or similar device that resides in a user's home or business but perhaps in a closet, basement, attic, or the like). One benefit to the server/system 120 being in a user's home/business is that data used to process a command/return a response may be kept within the user's home, thus reducing potential privacy concerns.

Multiple systems (120/525) may be included in the overall system 100 of the present disclosure, such as one or more natural language processing systems 120 for performing ASR processing, one or more natural language processing systems 120 for performing NLU processing, one or more skill systems 525, etc. In operation, each of these systems may include computer-readable and computer-executable instructions that reside on the respective device (120/525), as will be discussed further below.

Each of these devices (110/120/525) may include one or more controllers/processors (1104/1204), which may each include a central processing unit (CPU) for processing data and computer-readable instructions, and a memory (1106/1206) for storing data and instructions of the respective device. The memories (1106/1206) may individually include volatile random access memory (RAM), non-volatile read only memory (ROM), non-volatile magnetoresistive memory (MRAM), and/or other types of memory. Each device (110/120/525) may also include a data storage component (1108/1208) for storing data and controller/processor-executable instructions. Each data storage component (1108/1208) may individually include one or more non-volatile storage types such as magnetic storage, optical storage, solid-state storage, etc. Each device (110/120/525) may also be connected to removable or external non-volatile memory and/or storage (such as a removable memory card, memory key drive, networked storage, etc.) through respective input/output device interfaces (1102/1202).

Computer instructions for operating each device (110/120/525) and its various components may be executed by the respective device's controller(s)/processor(s) (1104/1204), using the memory (1106/1206) as temporary "working" storage at runtime. A device's computer instructions may be stored in a non-transitory manner in non-volatile memory (1106/1206), storage (1108/1208), or an external device(s). Alternatively, some or all of the executable instructions may be embedded in hardware or firmware on the respective device in addition to or instead of software.

Each device (110/120/525) includes input/output device interfaces (1102/1202). A variety of components may be connected through the input/output device interfaces (1102/1202), as will be discussed further below. Additionally, each device (110/120/525) may include an address/data bus (1124/1224) for conveying data among components of the respective device. Each component within a device (110/120/525) may also be directly connected to other components in addition to (or instead of) being connected to other components across the bus (1124/1224).

Referring to FIG. 11, the device 110 may include input/output device interfaces 1102 that connect to a variety of components such as an audio output component such as a speaker 112, a wired headset or a wireless headset (not illustrated), or other component capable of outputting audio. The device 110 may also include an audio capture component. The audio capture component may be, for example, a microphone 114 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 116 for displaying content. The device 110 may further include a camera 1118.

Via antenna(s) 1122, the input/output device interfaces 1102 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1102/1202) may also include communication components that allow data to be exchanged between devices such as different physical servers in a collection of servers or other components.

The components of the device(s) 110, the natural language command processing system 120, or a skill system 525 may include their own dedicated processors, memory, and/or storage. Alternatively, one or more of the components of the device(s) 110, the natural language command processing system 120, or a skill system 525 may utilize the I/O interfaces (1102/1202), processor(s) (1104/1204), memory (1106/1206), and/or storage (1108/1208) of the device(s) 110, natural language command processing system 120, or the skill system 525, respectively. Thus, the ASR component 550 may have its own I/O interface(s), processor(s), memory, and/or storage; the NLU component 560 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system 120, and a skill system 525, as described herein, are illustrative, and may be located as a stand-alone device or may be included, in whole or in part, as a component of a larger device or system. As can be appreciated, a number of components may exist either on a system 120 and/or on device 110. For example, the language processing components 592 (which may include ASR 550), language output components 593 (which may include NLG 579 and TTS 580), etc., for example as illustrated in FIGS. 5 and 6. Unless expressly noted otherwise, the system version of such components may operate similarly to the device version of such components and thus the description of one version (e.g., the system version or the local version) applies to the description of the other version (e.g., the local version or system version) and vice-versa.

As illustrated in FIG. 13, multiple devices (110a-110n, 120, 525) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110j, etc. (e.g., a device such as a FireTV stick, Echo Auto or the like) may be connected to the network(s) 199 through a wireless service provider, over a Wi-Fi or cellular network connection, or the like. Other devices are included as network-connected support devices, such as the natural language command processing system 120, the skill system(s) 525, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 550, the NLU component 560, etc. of the natural language command processing system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
determining a first amount of time corresponding to a first wakeword detectable by a voice-controlled device, wherein the voice-controlled device is configured to perform speech processing using at least a first virtual assistant profile corresponding to the first wakeword and a second virtual assistant profile representing a default virtual assistant profile for the voice-controlled device;
determining a second amount of time corresponding to a second wakeword detectable by the voice-controlled device, wherein the first amount of time is longer than the second amount of time;
based at least in part on the first amount of time being longer than the second amount of time, determining a threshold amount of time representing the first amount of time plus a third amount of time representing a margin duration of time;
receiving an indication to begin processing audio data corresponding to an utterance starting at a first time;
processing the audio data to detect a potential representation of one or more wakewords;
determining a second time that follows the first time by at least the threshold amount of time;
storing, in a memory, a first portion of the audio data received between the first time and the second time;
determining, at or after the second time, the one or more wakewords are undetected in a first portion of the audio data processed between the first time and the second time; and
in response to determining that the one or more wakewords are undetected:
sending the first portion of the audio data to a speech-processing system corresponding to the default virtual assistant profile, and
sending a second portion of the audio data received after the second time to the speech-processing system.

2. The computer-implemented method of claim 1, further comprising:
receiving an indication of a button selection associated with the voice-controlled device, wherein the indication of the button selection represents the indication to begin speech processing of the audio data;
in response to receiving the indication of the button selection, generating the audio data based on audio received by a microphone of the voice-controlled device;
processing the audio data using a voice-activity detector;
determining, using a voice-activity detector, an indication of speech in the audio data; and
determining the first time based on a beginning of the indication of speech in the audio data.

3. The computer-implemented method of claim 1, further comprising:
determining a first voice-activity detection signature for the first wakeword;
determining a second voice-activity detection signature for the second wakeword;
processing the first portion of the audio data using a voice-activity detector;
receiving, from the voice-activity detector, a voice activity detection signal representing speech detected in the first portion of the audio data;
determining that the voice activity detection signal indicates a gap in the speech represented in the first portion of the audio data;
determining that the voice activity detection signal does not match the first voice-activity detection signature or the second voice-activity detection signature; and
in response to determining that the voice activity detection signal does not match the first voice-activity detection signature or the second voice-activity detection signature, sending the first portion of the audio data to the speech-processing system prior to the second time.

4. A method comprising:
receiving a first indication to begin processing audio data;
receiving, by a voice-controlled device, first audio data corresponding to an utterance;
processing the first audio data to detect a potential representation of at least a first wakeword, wherein the voice-controlled device is configured to cause speech processing with regard to at least one of a first virtual assistant profile corresponding to the first wakeword or a second virtual assistant profile different from the first virtual assistant profile;
storing, in a memory, a first portion of the first audio data received during a first duration of time following the first indication, the first duration of time corresponding to the at least first wakeword;
determining that the at least first wakeword is undetected during the first duration of time; and
in response to determining that the at least first wakeword is undetected during the first duration of time, sending the first portion and a second portion of the first audio data received after the first portion to a speech-processing component for speech processing based on the second virtual assistant profile.

5. The method of claim 4, wherein:
the first indication is detection of a gesture by the voice-controlled device, and
the first duration of time is measured from a time of detecting the gesture.

6. The method of claim 4, further comprising:
detecting, after receiving the first indication, voice activity in the first audio data, wherein the first duration of time is measured from a time of detecting the voice activity.

7. The method of claim 4, further comprising:
determining, using a voice-activity detector, a beginning of voice-activity represented in the first audio data;
determining, using the voice-activity detector, a voice activity detection signal representing speech detected in the first audio data; and
determining that the voice activity detection signal differs from a first voice activity detection signature corresponding to the first wakeword, wherein determining that the at least first wakeword is undetected during the first duration of time is based at least in part on determining that the voice activity detection signal differs from a first voice activity detection signature corresponding to the first wakeword.

8. The method of claim 4, further comprising:
in response to determining that the at least first wakeword is undetected during the first duration of time, sending a request to initiate a session using the second virtual assistant profile; and receiving a second indication to initiate the session, wherein sending the first portion and the second portion is based on receiving the second indication, and the speech-processing component corresponds-system corresponding to the second virtual assistant profile.

9. The method of claim 4, further comprising:
receiving a second indication to begin processing audio data;
receiving second audio data corresponding to a second utterance;
processing the second audio data to detect a potential representation of at least the first wakeword and a second wakeword corresponding to the second virtual assistant profile;
determining that a representation of the second wakeword has been detected during a second duration of time following the first indication, wherein the second duration of time corresponds to at least the first wakeword and the second wakeword; and
in response to determining that a representation of the second wakeword has been detected during the second duration of time, causing speech processing of the second audio data based on the second virtual assistant profile.

10. The method of claim 4, further comprising:
receiving a second indication to begin processing audio data;
receiving second audio data corresponding to a second utterance;
processing the second audio data to detect a potential representation of at least the first wakeword and a second wakeword corresponding to the second virtual assistant profile;
determining that a representation of the first wakeword has been detected during a second duration of time following the first indication, wherein the second duration of time corresponds to at least the first wakeword and the second wakeword; and
in response to determining that a representation of the first wakeword has been detected during the second duration of time, causing speech processing of the second audio data based on the first virtual assistant profile.

11. The method of claim 4, wherein:
the second virtual assistant profile represents a default virtual assistant profile for the voice-controlled device,
the speech-processing component corresponds to the second virtual assistant profile, and
the speech-processing component is configured to perform processing specific to functions of the voice-controlled device.

12. The method of claim 11, further comprising:
determining, prior to receiving the first indication, a second duration of time corresponding to the first wakeword;
determining a third duration of time corresponding to a second wakeword detectable by the voice-controlled device;
determining that the second duration of time is longer than the third duration of time; and
based at least in part on the second duration of time being longer than the third duration of time, determining the first duration of time based on the second duration of time plus a margin duration of time.

13. A system, comprising:
at least one processor; and
at least one memory comprising instructions that, when executed by the at least one processor, cause the system to:
receive a first indication to begin processing audio data;
receive, by a voice-controlled device, first audio data corresponding to an utterance;
process the first audio data to detect a potential representation of at least a first wakeword, wherein the voice-controlled device is configured to cause speech processing with regard to at least one of a first virtual assistant profile corresponding to the first wakeword or a second virtual assistant profile different from the first virtual assistant profile;
storing, in a memory, a first portion of the first audio data received during a first duration of time following the first indication, the first duration of time corresponding to the at least first wakeword;
determine that the at least first wakeword is undetected during the first duration of time; and
in response to determining that the at least first wakeword is undetected during the first duration of time, send the first portion and a second portion of the first audio data received after the first portion to a speech-processing component for speech processing based on the second virtual assistant profile.

14. The system of claim 13, wherein:
the first indication is detection of a gesture by the voice-controlled device, and
the first duration of time is measured from a time of detecting the gesture.

15. The system of claim 13, wherein the at least one memory further comprises instructions that, when executed by the at least one processor, further cause the system to:
detect, after receiving the first indication, voice activity in the first audio data, wherein the first duration of time is measured from a time of detecting the voice activity.

16. The system of claim 13, wherein the at least one memory further comprises instructions that, when executed by the at least one processor, further cause the system to:
determine, using a voice-activity detector, a beginning of voice-activity represented in the first audio data;
determine, using the voice-activity detector, a voice activity detection signal representing speech detected in the first audio data; and
determine that the voice activity detection signal differs from a first voice activity detection signature corresponding to the first wakeword, wherein determining that the at least first wakeword is undetected during the first duration of time is based at least in part on determining that the voice activity detection signal differs from a first voice activity detection signature corresponding to the first wakeword.

17. The system of claim 13, wherein the at least one memory further comprises instructions that, when executed by the at least one processor, further cause the system to:
in response to determining that the at least first wakeword is undetected during the first duration of time, send a request to initiate a session using the second virtual assistant profile; and
receive a second indication to initiate the session, wherein sending the first portion and the second portion is based on receiving the second indication, and the speech-processing component corresponds system corresponding to the second virtual assistant profile.

18. The system of claim 13, wherein the at least one memory further comprises instructions that, when executed by the at least one processor, further cause the system to:

receive a second indication to begin processing audio data;

receive second audio data corresponding to a second utterance;

process the second audio data to detect a potential representation of at least the first wakeword and a second wakeword corresponding to the second virtual assistant profile;

determine that a representation of the second wakeword has been detected during a second duration of time following the first indication, wherein the second duration of time corresponds to at least the first wakeword and the second wakeword; and in response to determining that a representation of the second wakeword has been detected during the second duration of time, cause speech processing of the second audio data based on the second virtual assistant profile.

19. The system of claim 13, wherein the at least one memory further comprises instructions that, when executed by the at least one processor, further cause the system to:

receive a second indication to begin processing audio data;

receive second audio data corresponding to a second utterance;

process the second audio data to detect a potential representation of at least the first wakeword and a second wakeword corresponding to the second virtual assistant profile;

determine that a representation of the first wakeword has been detected during a second duration of time following the first indication, wherein the second duration of time corresponds to at least the first wakeword and the second wakeword; and in response to determining that a representation of the first wakeword has been detected during the second duration of time, cause speech processing of the second audio data based on the first virtual assistant profile.

20. The system of claim 13, wherein:

the second virtual assistant profile represents a default virtual assistant profile for the voice-controlled device, the speech-processing component corresponds to the second virtual assistant profile, and the speech-processing component is configured to perform processing specific to functions of the voice-controlled device.

\* \* \* \* \*